United States Patent [19]
Tanaka et al.

[11] Patent Number: 5,757,423
[45] Date of Patent: May 26, 1998

[54] IMAGE TAKING APPARATUS

[75] Inventors: Tsunefumi Tanaka; Sadahiko Tsuji; Kenichi Shinbori, all of Yokohama; Shigeo Ogura, Tokyo; Makoto Sekita, Yokohama; Nobuhiro Takeda, Kawasaki; Masashi Hori, Yokohama; Yasuyuki Yamazaki, Matsudo; Yoshihiro Honma, Asaka; Masato Kosugi, Yokohama; Toshikazu Yanai, Kawasaki, all of Japan

[73] Assignee: Canon Kabushiki Kaisha, Tokyo, Japan

[21] Appl. No.: 326,095

[22] Filed: Oct. 19, 1994

[30] Foreign Application Priority Data

| Oct. 22, 1993 | [JP] | Japan | 5-287744 |
| Oct. 22, 1993 | [JP] | Japan | 5-287746 |
| Oct. 22, 1993 | [JP] | Japan | 5-287748 |
| Oct. 22, 1993 | [JP] | Japan | 5-287749 |
| Oct. 22, 1993 | [JP] | Japan | 5-287750 |
| Oct. 22, 1993 | [JP] | Japan | 5-287751 |
| Oct. 27, 1993 | [JP] | Japan | 5-291417 |
| Dec. 22, 1993 | [JP] | Japan | 5-346645 |
| Jan. 31, 1994 | [JP] | Japan | 6-027475 |

[51] Int. Cl.⁶ ............................. H04N 5/225
[52] U.S. Cl. ...................... 348/218; 348/335
[58] Field of Search .................... 348/207, 335, 348/336, 337, 340, 345, 349, 354, 218; 358/450; H04N 5/225

[56] References Cited

U.S. PATENT DOCUMENTS

| 3,548,087 | 12/1970 | Shimada | 348/262 |
| 4,383,170 | 5/1983 | Takagi et al. | 848/335 |
| 4,943,850 | 7/1990 | Asaida | 348/262 |
| 5,151,790 | 9/1992 | Takatori et al. | 348/335 |
| 5,159,455 | 10/1992 | Cox et al. | 348/218 |

Primary Examiner—Andrew Faile
Assistant Examiner—Tuan V. Ho
Attorney, Agent, or Firm—Morgan & Finnegan LLP

[57] ABSTRACT

There is disclosed an image taking apparatus comprising a first optical unit for forming an image, a second optical unit positioned on the optical axis of the first optical unit, a third optical unit positioned behind the second optical unit and having plural lens units for re-focusing parts of the image of the first optical unit, converters for converting the plural images, formed by the third optical unit, into electrical signals, and a processor for processing the electrical signals from the converters in order to obtain an image of a high definition.

10 Claims, 47 Drawing Sheets

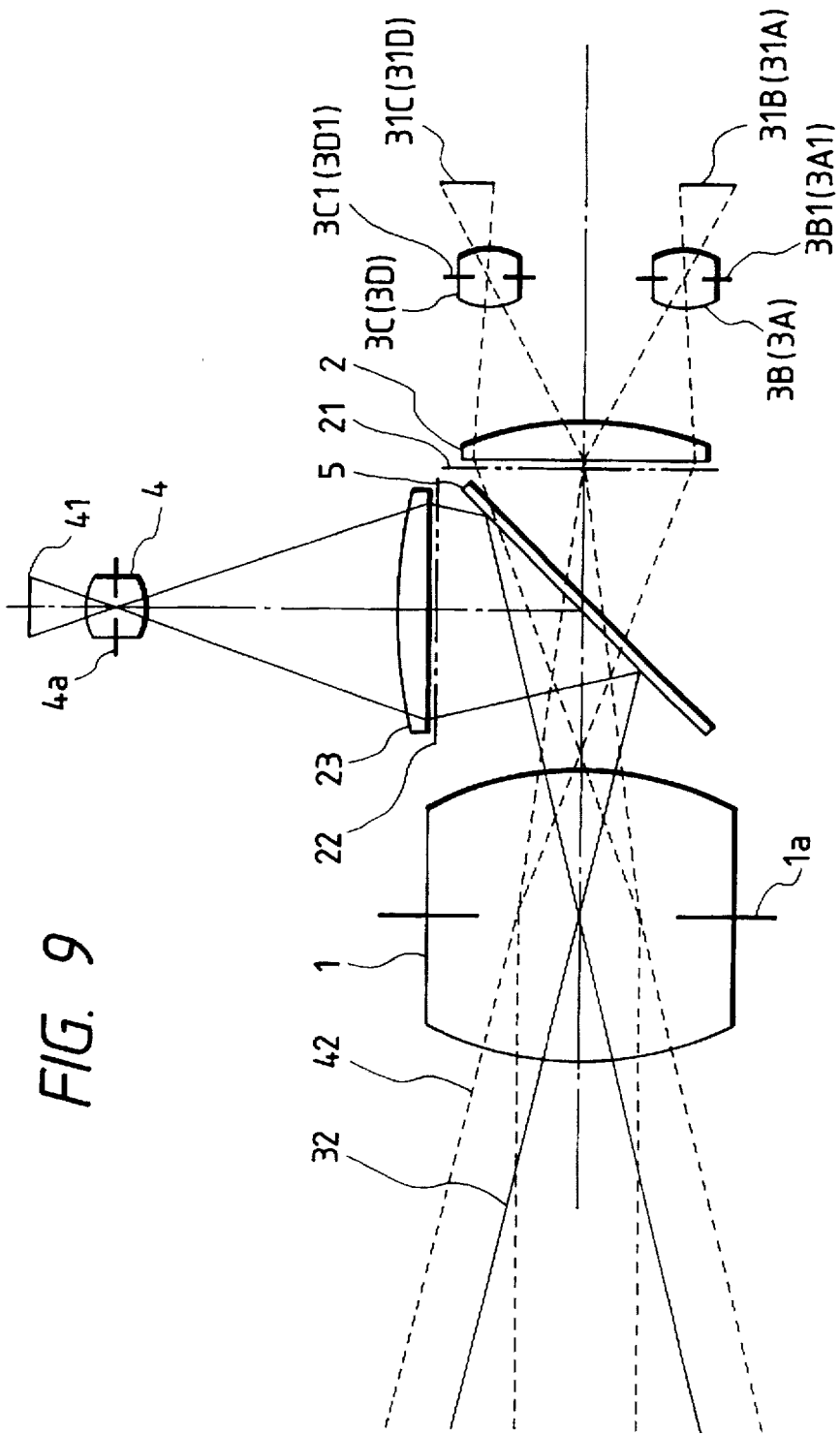

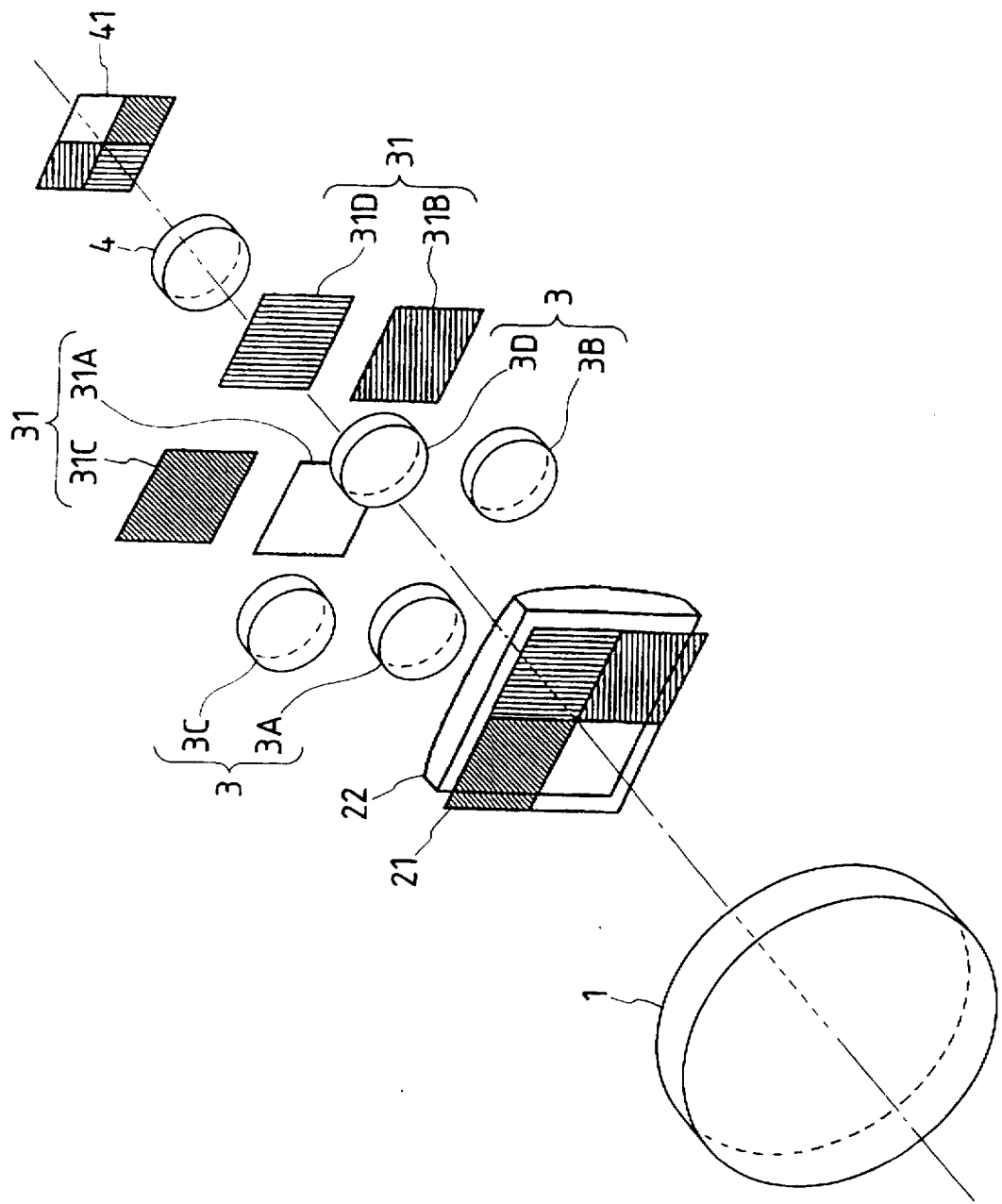

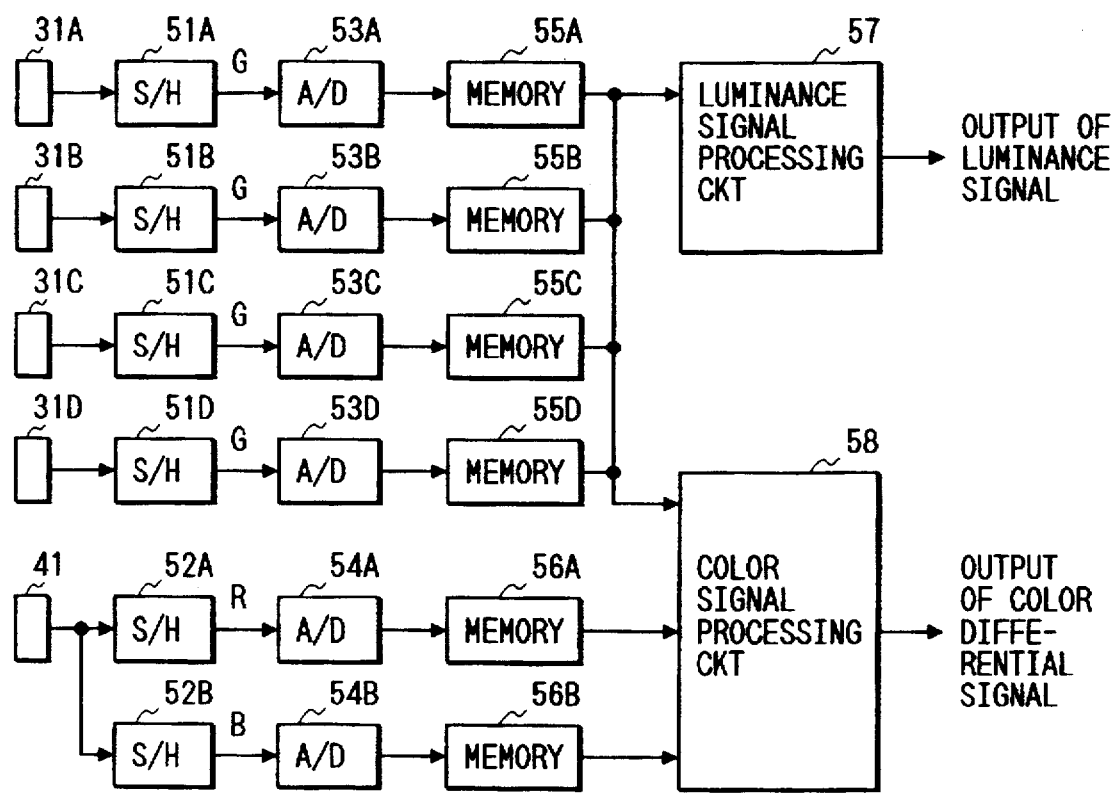

FIG. 22A
31(31A~31D)

| G | G | G | G | G | G |
|---|---|---|---|---|---|
| G | G | G | G | G | G |
| G | G | G | G | G | G |
| G | G | G | G | G | G |
| G | G | G | G | G | G |
| G | G | G | G | G | G |

FIG. 22B
41

| R | B | R | B | R | B |
|---|---|---|---|---|---|
| R | B | R | B | R | B |
| R | B | R | B | R | B |
| R | B | R | B | R | B |
| R | B | R | B | R | B |
| R | B | R | B | R | B |

FIG. 23A
31(31A~31D)

| Y | Y | Y | Y | Y | Y |
|---|---|---|---|---|---|
| Y | Y | Y | Y | Y | Y |
| Y | Y | Y | Y | Y | Y |
| Y | Y | Y | Y | Y | Y |
| Y | Y | Y | Y | Y | Y |
| Y | Y | Y | Y | Y | Y |

FIG. 23B
41

| R | B | R | B | R | B |
|---|---|---|---|---|---|
| B | R | B | R | B | R |
| R | B | R | B | R | B |
| B | R | B | R | B | R |
| R | B | R | B | R | B |
| B | R | B | R | B | R |

FIG. 24A
31(31A~31D)

| Y | Y | Y | Y | Y | Y |
|---|---|---|---|---|---|
| Y | Y | Y | Y | Y | Y |
| Y | Y | Y | Y | Y | Y |
| Y | Y | Y | Y | Y | Y |
| Y | Y | Y | Y | Y | Y |
| Y | Y | Y | Y | Y | Y |

FIG. 24B
41

| R | B | R | B | R | B |
|---|---|---|---|---|---|
| R | B | R | B | R | B |
| R | B | R | B | R | B |
| R | B | R | B | R | B |
| R | B | R | B | R | B |
| R | B | R | B | R | B |

| W | W | W | W | W | W |
|---|---|---|---|---|---|
| W | W | W | W | W | W |
| W | W | W | W | W | W |
| W | W | W | W | W | W |
| W | W | W | W | W | W |
| W | W | W | W | W | W |

| R | G | B | R | G | B |
|---|---|---|---|---|---|
| R | G | B | R | G | B |
| R | G | B | R | G | B |
| R | G | B | R | G | B |
| R | G | B | R | G | B |
| R | G | B | R | G | B |

| G | G | G | G | G | G |
|---|---|---|---|---|---|

| R | B | R | B | R | B |
|---|---|---|---|---|---|
| B | R | B | R | B | R |
| R | B | R | B | R | B |
| B | R | B | R | B | R |
| R | B | R | B | R | B |
| B | R | B | R | B | R |

| G | G | G | G | G | G |
|---|---|---|---|---|---|

| R | B | R | B | R | B |
|---|---|---|---|---|---|
| R | B | R | B | R | B |
| R | B | R | B | R | B |
| R | B | R | B | R | B |
| R | B | R | B | R | B |
| R | B | R | B | R | B |

| Y | Y | Y | Y | Y | Y |

| R | B | R | B | R | B |
| B | R | B | R | B | R |
| R | B | R | B | R | B |
| B | R | B | R | B | R |
| R | B | R | B | R | B |
| B | R | B | R | B | R |

| Y | Y | Y | Y | Y | Y |

| R | B | R | B | R | B |
| R | B | R | B | R | B |
| R | B | R | B | R | B |
| R | B | R | B | R | B |
| R | B | R | B | R | B |
| R | B | R | B | R | B |

| W | W | W | W | W | W |

| R | G | B | R | G | B |
| R | G | B | R | G | B |
| R | G | B | R | G | B |
| R | G | B | R | G | B |
| R | G | B | R | G | B |
| R | G | B | R | G | B |

| G | G | G | G | G | G |
|---|---|---|---|---|---|
| G | G | G | G | G | G |
| G | G | G | G | G | G |
| G | G | G | G | G | G |
| G | G | G | G | G | G |
| G | G | G | G | G | G |

| R | B | R | B | R | B |
|---|---|---|---|---|---|
| B | R | B | R | B | R |
| R | B | R | B | R | B |
| B | R | B | R | B | R |
| R | B | R | B | R | B |
| B | R | B | R | B | R |

| G | G | G | G | G | G |
|---|---|---|---|---|---|
| G | G | G | G | G | G |
| G | G | G | G | G | G |
| G | G | G | G | G | G |
| G | G | G | G | G | G |
| G | G | G | G | G | G |

| R | B | R | B | R | B |
|---|---|---|---|---|---|
| R | B | R | B | R | B |
| R | B | R | B | R | B |
| R | B | R | B | R | B |
| R | B | R | B | R | B |
| R | B | R | B | R | B |

| Y | Y | Y | Y | Y | Y |
|---|---|---|---|---|---|
| Y | Y | Y | Y | Y | Y |
| Y | Y | Y | Y | Y | Y |
| Y | Y | Y | Y | Y | Y |
| Y | Y | Y | Y | Y | Y |
| Y | Y | Y | Y | Y | Y |

| R | B | R | B | R | B |
|---|---|---|---|---|---|
| B | R | B | R | B | R |
| R | B | R | B | R | B |
| B | R | B | R | B | R |
| R | B | R | B | R | B |
| B | R | B | R | B | R |

| Y | Y | Y | Y | Y | Y |
|---|---|---|---|---|---|
| Y | Y | Y | Y | Y | Y |
| Y | Y | Y | Y | Y | Y |
| Y | Y | Y | Y | Y | Y |
| Y | Y | Y | Y | Y | Y |
| Y | Y | Y | Y | Y | Y |

| R | B | R | B | R | B |
|---|---|---|---|---|---|
| R | B | R | B | R | B |
| R | B | R | B | R | B |
| R | B | R | B | R | B |
| R | B | R | B | R | B |
| R | B | R | B | R | B |

| W | W | W | W | W | W |
|---|---|---|---|---|---|
| W | W | W | W | W | W |
| W | W | W | W | W | W |
| W | W | W | W | W | W |
| W | W | W | W | W | W |
| W | W | W | W | W | W |

| R | G | B | R | G | B |
|---|---|---|---|---|---|
| R | G | B | R | G | B |
| R | G | B | R | G | B |
| R | G | B | R | G | B |
| R | G | B | R | G | B |
| R | G | B | R | G | B |

| Y | Y | Y | Y | Y | Y |
|---|---|---|---|---|---|
| Y | Y | Y | Y | Y | Y |
| Y | Y | Y | Y | Y | Y |
| Y | Y | Y | Y | Y | Y |
| Y | Y | Y | Y | Y | Y |
| Y | Y | Y | Y | Y | Y |

| R | R | R | R | R | R |
|---|---|---|---|---|---|
| R | R | R | R | R | R |
| R | R | R | R | R | R |
| R | R | R | R | R | R |
| R | R | R | R | R | R |
| R | R | R | R | R | R |

| B | B | B | B | B | B |
|---|---|---|---|---|---|
| B | B | B | B | B | B |
| B | B | B | B | B | B |
| B | B | B | B | B | B |
| B | B | B | B | B | B |
| B | B | B | B | B | B |

| G | G | G | G | G | G |
|---|---|---|---|---|---|
| G | G | G | G | G | G |
| G | G | G | G | G | G |
| G | G | G | G | G | G |
| G | G | G | G | G | G |
| G | G | G | G | G | G |

| R | B | R | B | R | B |
|---|---|---|---|---|---|
| B | R | B | R | B | R |
| R | B | R | B | R | B |
| B | R | B | R | B | R |
| R | B | R | B | R | B |
| B | R | B | R | B | R |

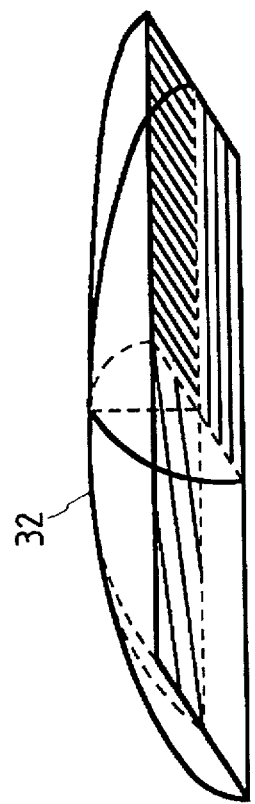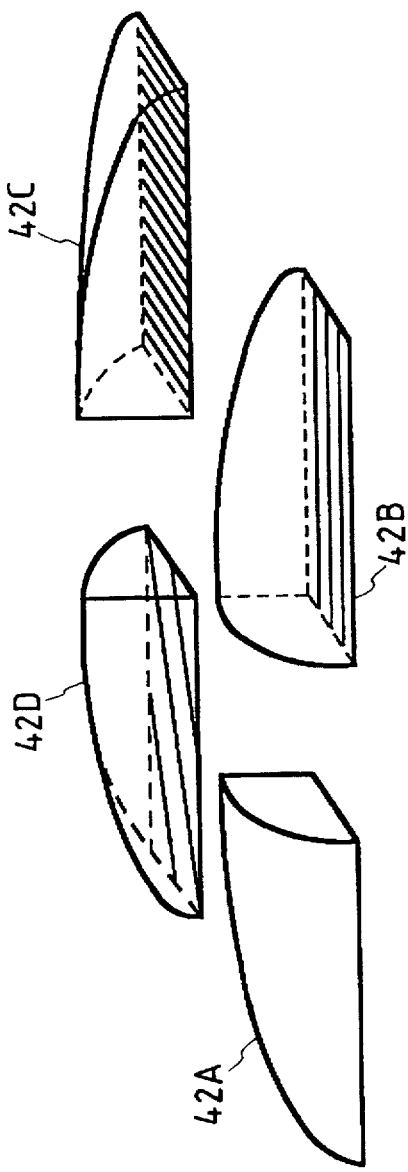

IMAGE TAKING APPARATUS

BACKGROUND OF THE INVENTION

1. Field of the Invention

The present invention relates to an image taking apparatus, and more particularly to an image taking apparatus capable of easily providing image information of a high resolving power by utilizing plural image sensor devices of a limited number of pixels, without any particular increase in the number of pixels, and adapted for use in a compact video camera, a still video camera or the like.

2. Related Background Art

The solid-state area sensor (image sensor with two-dimensionally arranged pixels), employed recently as the image pickup device in image taking apparatus such as compact video cameras or still video cameras, have shown remarkable progresses in the increase of number of pixels in the cost reduction and in the compactization, and are being utilized in various image taking apparatus.

The commercially available image sensor devices generally have about 400,000 pixels, approximately corresponding to the resolving power of the television of present standards, such as NTSC. However, if the image entered by such image sensor device is reproduced on a large-sized image or hard copy, or on computer graphics, the coarseness of the pixels becomes conspicuous, and it is difficult to obtain an image of high definition.

Also solid-state area sensors of about two million pixels for high definition television are recently being developed, but the resolving power with such number of pixels is still insufficient for image input for the display of an ultra-large size. Thus the number of pixels of the current area sensors is insufficient for obtaining the image of higher definition (higher resolving power).

For obtaining an image of a higher resolving power with an image sensor, there is already known a method of increasing the density of pixels thereof and increasing the number of pixels.

However, a reduction in the area of each pixel for increasing the density of pixels generally reduces the signal, thereby deteriorating the S/N ratio. In consideration of this deterioration of the S/N ratio, the number of pixels of two million is already close to the limit, and it is very difficult, in the present technology level, to improve the resolving power by the increase in the number of pixels.

For this reason there have been proposed various methods for improving the resolving power of the image, without increase in the number of pixels, such as those disclosed in the Japanese Patent Publication Nos. 50-13052 and 59-18909, and the method by pixel displacement disclosed in the Japanese Patent Publication No. 59-43035.

In the method of pixel displacement, an optical element for splitting the light beam coming from the object, such as a dichroic prism or a half mirror, is provided at the image side of the image taking optical system, and an image of a higher resolving power is obtained by receiving the light beams split by said optical element, with plural solid-state area sensors positioned with mutual displacement by a half of the pitch of the pixels or less.

Also the Japanese Patent Laid-Open Application No. 4-286480 discloses obtaining an image of a higher resolving power by positioning at least an optical path splitting means behind an imaging lens, thereby splitting the image of the object into plural images by the splitting means, forming thus split plural images of the object respectively on plural solid-state area sensors positioned on the image plane and mutually interpolating the area which cannot be taken in respective sensors.

Also the Japanese Patent Laid-Open Application No. 63-193678 discloses positioning a wedge-shaped deflecting member in the optical path of an image taking optical system and periodically taking the movement of the image generated by the rotation of the deflecting member with an image sensor, thereby obtaining image information in excess of the number of pixels.

Furthermore, the Japanese Patent Laid-Open Application No. 60-250789 discloses obtaining an image of a high resolving power, by separating an image of the object, formed by an image taking optical system, into plural images by a secondary imaging optical system, then forming the separated images respectively on plural image sensors and synthesizing the outputs of said plural image sensors.

For obtaining an image of a high resolving power, the method of pixel displacement is associated with a drawback that the resolving power is not improved much in consideration of the number of pixels employed.

Also the method proposed in the Japanese Patent Laid-Open Application No. 4-286480 can provide an image of an improved resolving power by the increase of the number of split optical paths, but the back focus distance of the image taking lens has to be made extremely long, so that the entire apparatus inevitably becomes bulky. For this reason, there can only be employed, in practice, two image sensors or three image sensors at maximum, even in combination with a 3P prism.

Also the method proposed in the Japanese Patent Laid-Open Application No. 63-193678 is not suitable for a moving image, and requires an excessively long time for obtaining the output image, since the image of a frame is synthesized from plural image taking operations.

Furthermore, the method proposed in the Japanese Patent Laid-Open Application No. 60-250789 prevents lack of pixels at the boundary portion of the image by slightly displacing a light beam splitting mirror, functioning as the light beam splitting means, from the primary focal plane, but such configuration is extremely difficult to realize in consideration of the thickness of the light beam splitting mirror and the pupil for the off-axial light beam. Also it is difficult to obtain the image of a high resolving power, since the increase of the number of pixels is two or three times at maximum.

SUMMARY OF THE INVENTION

A first object of the present invention is to provide an image taking apparatus capable of easily providing an image of high definition, by appropriate positioning of plural image sensor devices of a limited number of pixels and of optical elements constituting an image taking optical system for forming the image of the object on the image sensor devices.

A second object of the present invention is to provide a focus detecting device adapted for use in the above-mentioned apparatus, under the above-mentioned object.

Still other objects and the configuration of the present invention will become fully apparent from the following description of the embodiments.

BRIEF DESCRIPTION OF THE DRAWINGS

FIGS. 9 and 10 are cross-sectional views of the optical system of other embodiments of the present invention;

FIG. 19 is a perspective view of the optical system shown in FIG. 18;

FIGS. 20A and 20B are views showing the arrangement of color filters in the present invention;

FIG. 21 is a block diagram showing the signal processing in the present invention;

FIGS. 22A to 31B are views showing the arrangement of color filters in the present invention;

FIGS. 33A to 36B are views showing the arrangement of color filters in the present invention;

FIGS. 41A to 42B are views showing the arrangement of color filters in the present invention;

FIGS. 54A and 54B are views showing shading characteristics of the image sensor device;

DETAILED DESCRIPTION OF THE PREFERRED EMBODIMENTS

Figure 1:
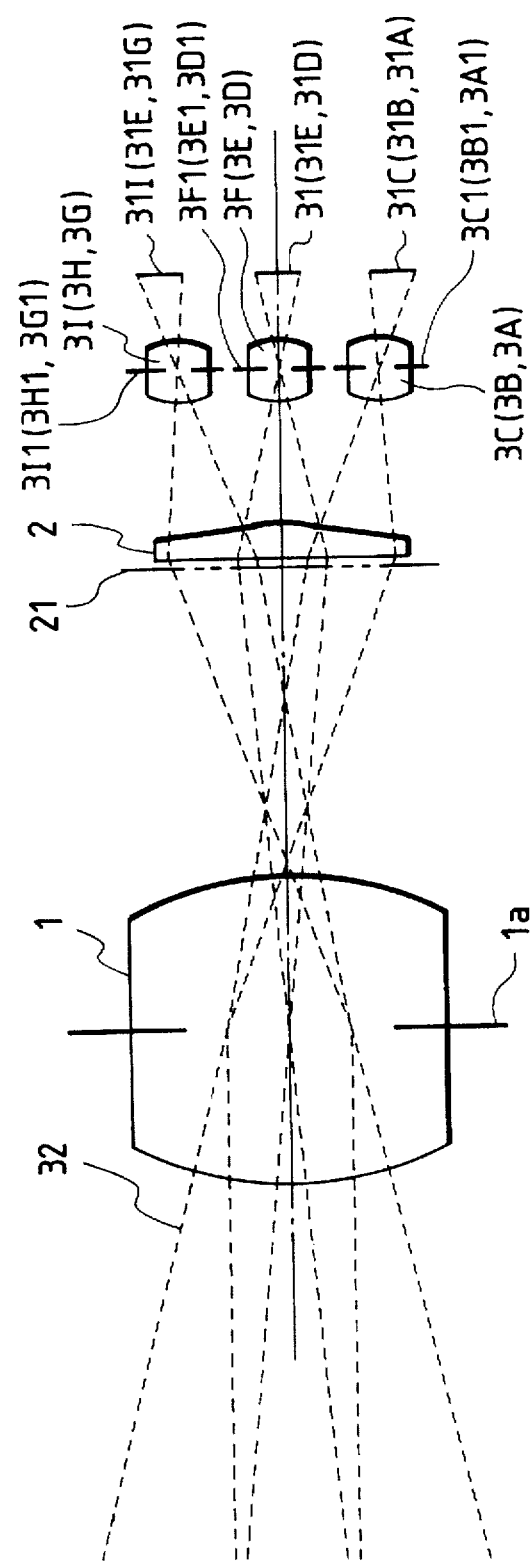
FIG. 1 is a cross-sectional view of the optical system of an image taking apparatus embodying the present invention.
Figure 2:
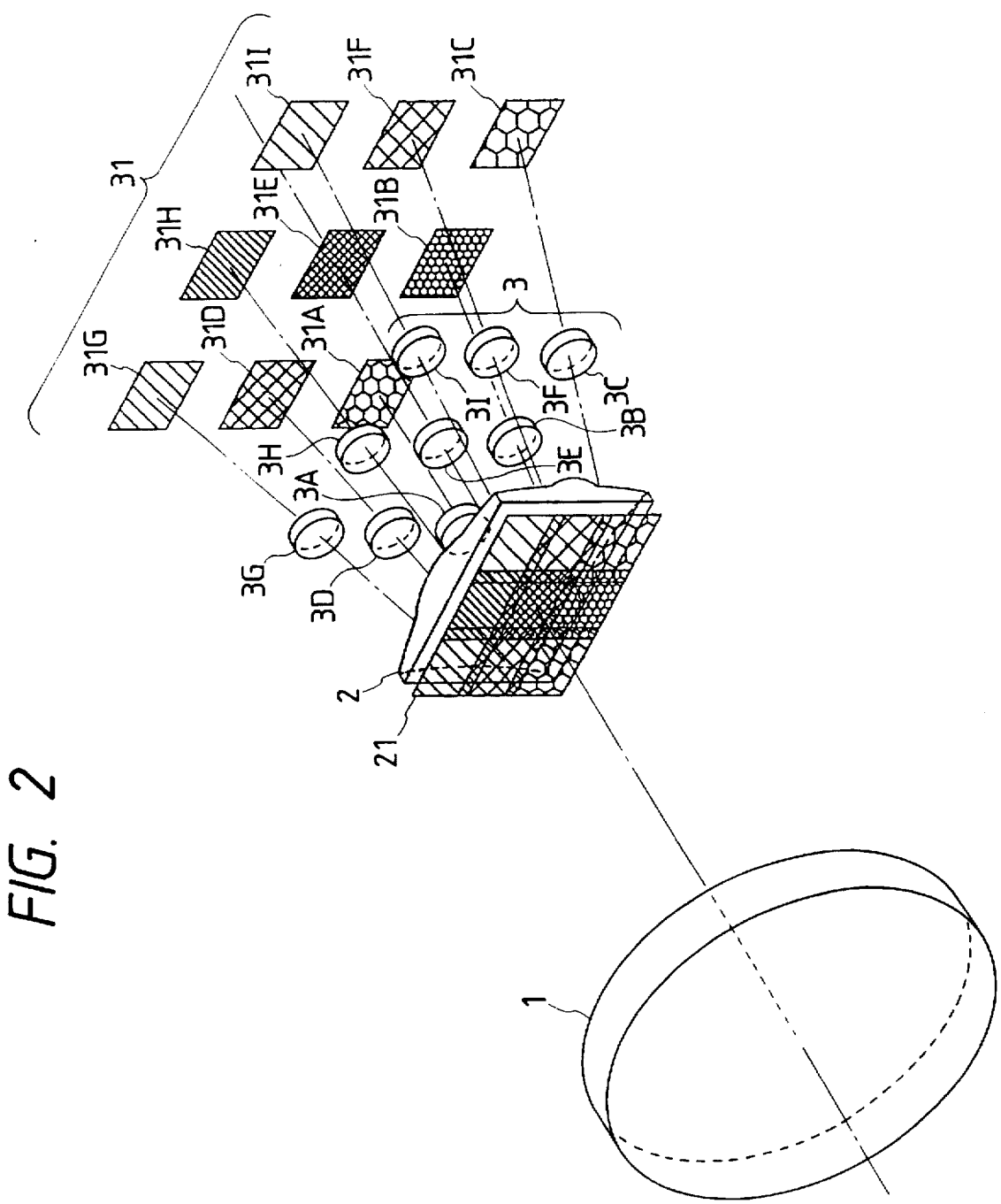
FIG. 2 is a perspective view of the optical system shown in FIG. 1.

FIG. 1 is a cross-sectional view of the optical system of a first embodiment of the present invention, and FIG. 2 is a perspective view thereof.

A first optical unit 1 focuses the image of the object on a primary focal plane (anticipated focal plane) 21.

A second optical unit 2, positioned in the vicinity of the primary focal plane 21 on the optical axis of the first optical unit 1, is composed of a field lens consisting of plural areas of different focal lengths (refractive powers) and is adapted to guide the light from the object image formed on the primary focal plane, to succeeding lens units.

A third optical unit 3 is provided with nine lens units 3A, 3B, 3C, 3D, 3E, 3F, 3G, 3H and 3I.

Said nine lens units 3A–3I are positioned behind the second optical unit 2, and the lens unit 3E is positioned on the optical axis of the first optical unit 1 while other lens units 3A–3D and 3F–3I have their optical axes out of the optical axis of the first optical unit 1.

Image taking means 31 is provided with nine image sensor elements 31A, 31B, 31C, 31D, 31E, 31F, 31G, 31H and 31I consisting for example of solid-state image sensors and positioned respectively on the image planes of the nine lens units 3A–3I.

The nine lens units 3A–3I of the third optical unit divide the object image, formed on the primary focal plane 21 by the first optical unit 1, into plural areas, and refocus the object images of the areas respectively on the corresponding image sensor elements 31A–31I.

In the present embodiment, the second optical unit 2 is so constructed that, as indicated by broken-lined optical paths 32 in FIG. 1, the pupils 3A1–3I1 of the plural lens units 3A–3I constituting the third optical unit 3 are respectively focused in the vicinity of the divided pupil areas of the first optical unit 1.

Besides, the second optical unit 2 is so constructed that the image positions of the plural lens units 3A–3I of the third optical unit 3 are aligned on a same plane.

In the present embodiment, as illustrated in FIG. 2, an image of the object is formed by the first optical unit 1 on the primary focal plane 21, and said object image is divided into nine areas and focused, by means of the second optical unit 2 and the nine lens units 3A–3I of the third optical unit 3, respectively on the image sensor elements 31A–31I. The image of the entire object is obtained by synthesizing image information from the nine image sensor elements 31A–31I by a signal processing unit (synthesizing unit).

The present embodiment is so constructed that the sum of the plural divided images, formed by the third optical unit 3, include the entire area of the object image formed by the first optical unit 1. More specifically, the neighboring divided images have pixels in overlapping manner at the boundary area, in order to avoid defects at the boundary portions of the image, as will be explained later.

Figure 3:
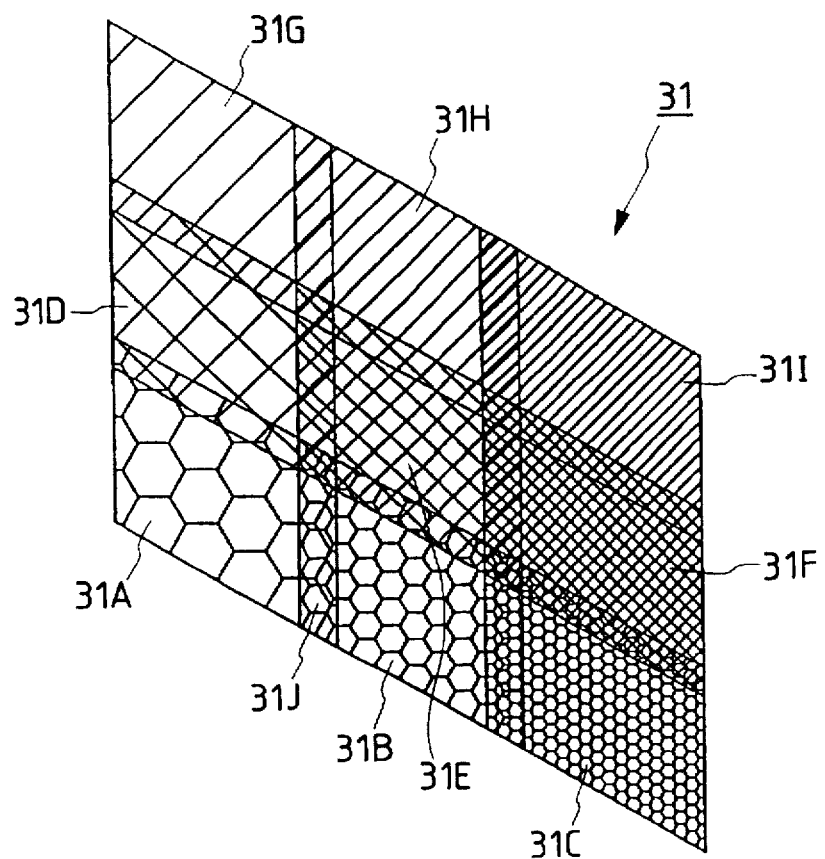
FIG. 3 is a synthesized view of image taking areas of the image taking means shown in FIG. 1.

FIG. 3 shows overlapping of the boundary portions, in the synthesis of divided images, formed on the nine image sensor elements 31A–31I corresponding to the entire area of the object image.

For example, pixels in a boundary portion 31J of the image sensor elements 31A and 31B are contained in both elements 31A and 31B, and corresponding pixels are extracted at the synthesis by the signal processing unit, so that the image in such boundary portion can be released without interruption.

Figure 4:
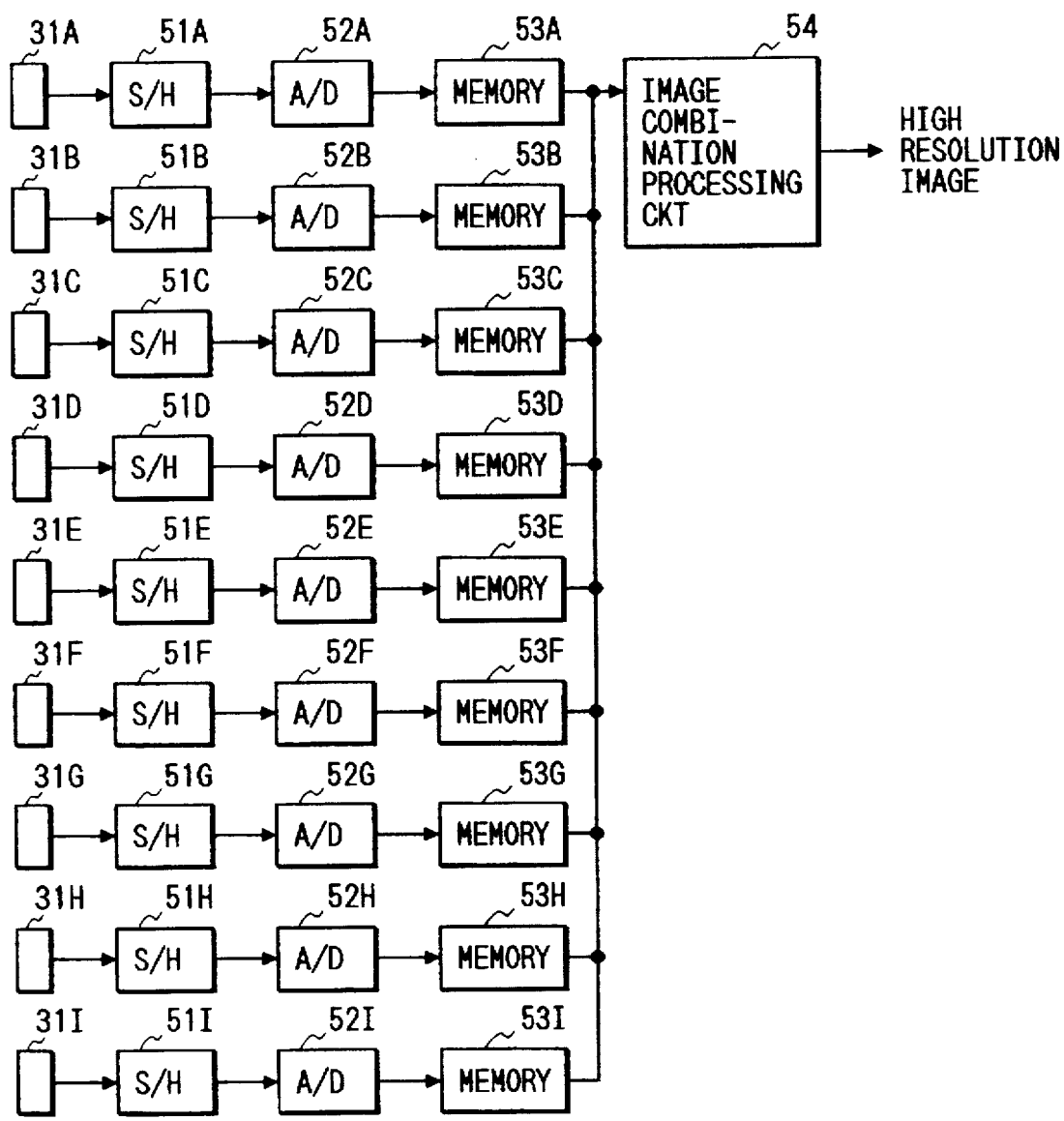
FIG. 4 is a block diagram of the signal processing in the apparatus shown in FIG. 1.

In the following the image processing method of the present embodiment will be explained with reference to FIG. 4, which is a schematic block diagram of the signal processing unit of the image taking apparatus of this embodiment.

In the present embodiment, electrical signals from the image sensor elements 31A–31I are retained by sample hold (S/H) circuits 51A–51I, then subjected to A/D conversion by analog-digital (A/D) conversion circuits 52A–52I, and stored in memory circuits 53A–53I. An image of a high resolving power is then obtained by reading information from the memories 53A–53I in an order enabling to constitute the entire image and synthesizing the information in an image combination processing circuit 54.

In the present embodiment, the second optical unit 2 is composed of a field lens having plural areas of different focal lengths (refractive powers), but it may also be composed of a field lens of a single focal length or any optical member having an optical function equivalent to that of the field lens, in order to achieve the effect of the present invention. Also the plural lens units of the third optical unit may be composed of a single optical element bearing plural lens units thereon.

Also in the present embodiment, the entire image area of the object image is divided into nine and thus divided images are combined by the signal processing unit to obtain an image of a high resolving power, but the number of the lens units constituting the third optical unit and the number of corresponding image sensor elements may be arbitrarily increased in order to increase the practical number of pixels, whereby a further increase in the resolving power of the image can be achieved.

Also in case of a still image, the aforementioned pixel displacement method may be used in combination, in order to achieve further improvement in the resolving power.

As explained in the foregoing, the present invention can provide an image taking apparatus capable of providing an image of a high resolving power with image sensor elements of a limited number of pixels, without restriction in the back focus of the image taking optical system and without defects in the boundary portions between the divided image areas, by suitable configuration of the elements constituting the image taking apparatus.

In the following there will be explained an improvement on the foregoing embodiment. In the improvement, there is provided an optical unit for re-focusing the entire image formed by the first optical unit, thereby being capable of responding to a state requiring the image of high resolving power and a state not requiring the image of high resolving power.

Figure 5:
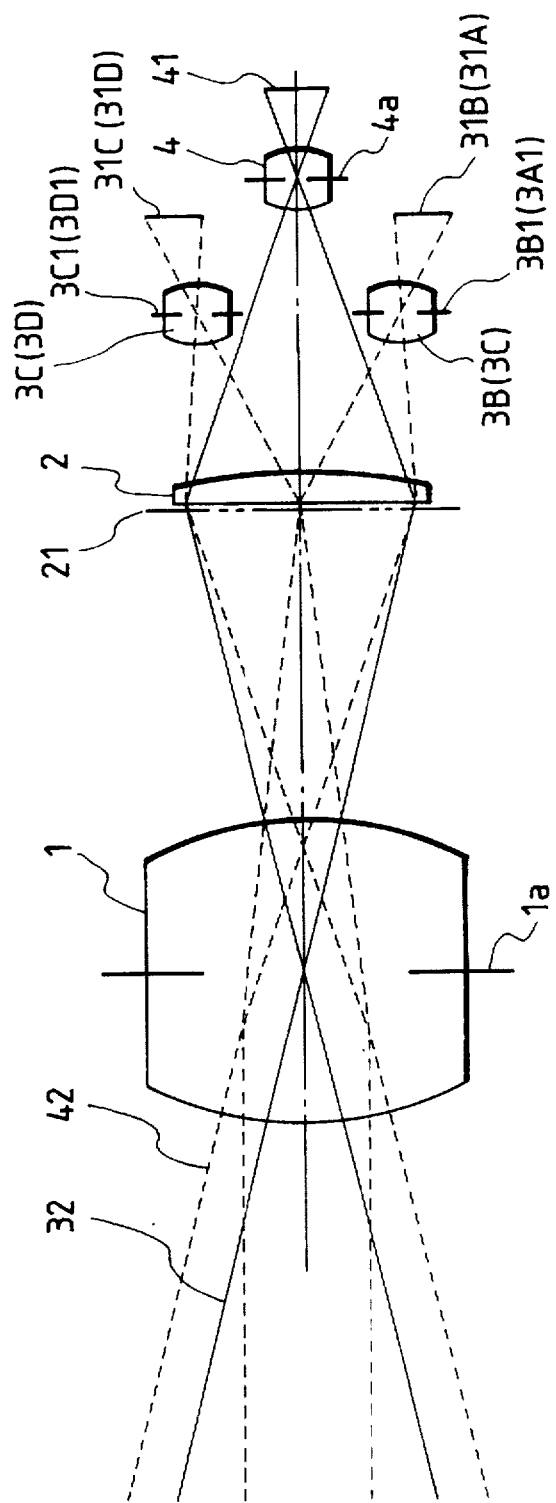
FIG. 5 is a cross-sectional view of the optical system of another embodiment of the present invention.
Figure 6:
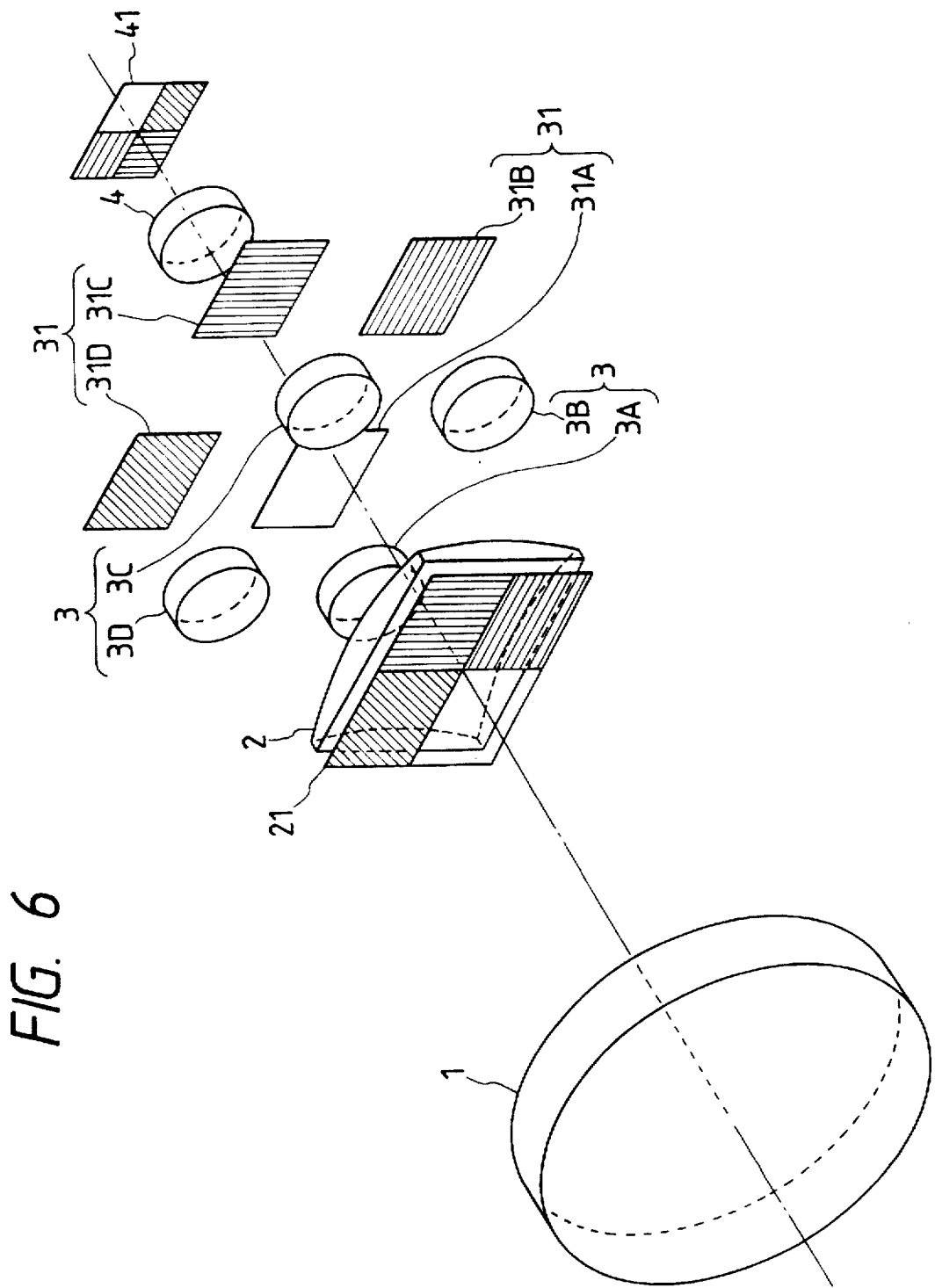
FIG. 6 is a perspective view of the optical system shown in FIG. 5.

FIG. 5 is a cross-sectional view of the optical system of the present embodiment, and FIG. 6 is a perspective view of the optical system of the embodiment.

Referring to these drawings, a first optical unit 1 focuses the image of the object on a primary focal plane (anticipated focal image) 21.

A second optical unit 2, positioned in the vicinity of the primary focal plane 21 on the optical axis of the first optical unit 1, guides the light from the object image, formed on the primary focal plane 21, to succeeding lens units.

A fourth optical unit 4 is positioned on the optical axis of the first optical unit 1, behind (at the image plane side) the second optical unit 2. Thus the optical axis of the fourth optical unit 4, that of the first optical unit 1 and that of the second optical unit 2 coincide mutually.

First (main) image taking means 41, composed for example of a solid-state area sensor, is positioned at an image plane behind the fourth optical unit 4.

Thus the entire area of the object image, formed on the primary focal plane 21 by the first optical unit 1, is re-focused, by means of the second optical unit 2 and the fourth optical unit 4, on the image taking means 41.

A third optical unit 3 is provided with four lens units 3A, 3B, 3C and 3D.

The four lens units 3A, 3B, 3C and 3D have their optical axes outside the optical axis of the first optical unit 1, and are positioned behind the second optical unit 2.

Second (sub) image taking means 31 is provided with four image sensor elements 31A, 31B, 31C and 31D composed for example of solid-state area sensors, and are respectively positioned on the focal planes of the four lens units 3A, 3B, 3C, 3D.

The four lens units 3A, 3B, 3C, 3D of the third optical unit 3 divide the object image, formed on the primary focal plane 21 by the first optical unit 1, into plural areas and reform the object images of the areas respectively on the image sensor elements 31A, 31B, 31C, 31D. As shown in the aforementioned drawings, the centers of the light-receiving faces of the image sensor elements 31A, 31B, 31C, 31D are deviated from the optical axis of the lens units of the third optical unit.

In the present embodiment, the second optical unit 2 maintains, as indicated by solid-lined optical paths 32, the pupil 1a of the first optical unit 1 and the pupil 4a of the fourth optical unit 4 in a substantially mutually conjugate relationship. Also as indicated by broken-lined optical paths 42, the pupils 3A1, 3B1, 3C1 and 3D1 of the plural lens units 3A, 3B, 3C, 3D constituting the third optical unit 3 are focused respectively in the vicinity of divide pupil areas of the first optical unit 1.

In the present embodiment, the fourth optical unit 4 and the four lens units (3A, 3B, 3C, 3D) of the third optical unit 3 have mutually different imaging magnifications, whereby the focusing of pupil is effectively matched.

In the present embodiment, the second optical unit 2 and the fourth optical unit 4 constitute an element of the re-focusing optical system, and the second optical unit 2 and the third optical unit 3 constitute an element of the dividing-focusing optical system.

In the present embodiment, as shown in FIG. 6, an object image is formed by the first optical unit 1 on the primary focal plane 21, and the entire area of the object image is then re-focused by the second optical unit 2 and the fourth optical unit 4, on the image taking means 41. Also the object image formed on the primary focal plane 21 is divided into four areas by the four lens units 3A, 3B, 3C, 3D constituting the third optical unit 3, and thus divided areas are respectively focused on the four image sensor elements 31A, 31B, 31C, 31D constituting the second image taking means 31.

In the present embodiment, in case an image of high resolving power is required, the object image is divided by the third optical unit 3 consisting of the four lens units 3A, 3B, 3C, 3D and focused on respectively corresponding image sensor elements 31A, 31B, 31C, 31D, and the entire image of the object is obtained by combining the image information from the four image sensor elements 31A, 31B, 31C, 31D by means of the signal processing unit, eventually utilizing the image information formed by the fourth optical unit 4 and the image taking means 31 as reference.

On the other hand, in the ordinary case in which the image of high resolving power is not required, the entire object image is focused by the fourth optical unit 4 on the image taking means 41, and the image information from said image taking means 41 is utilized.

In this manner the present embodiment enables arbitrary selection of the image obtained with the fourth optical unit 4 and the synthesized image obtained by the third optical unit 3, depending on whether the image of high resolving power is required.

Also in the present embodiment, the fourth optical unit 4 and the third optical unit 3 are positioned with mutually different optical axes, whereby the object image formed on the primary focal plane 21 is reformed with a desired amount of overlapping and a desired image magnification on the respectively corresponding image sensor elements.

Furthermore the present embodiment is so constructed that the sum of the divided plural images formed by the third optical unit 3 contains the entire area of the object image formed by the first optical unit 1. More specifically, the neighboring divided images have pixels in overlapping manner at the boundary area, in order to avoid defects at the boundary portions of the image, as will be explained later.

Figure 7:
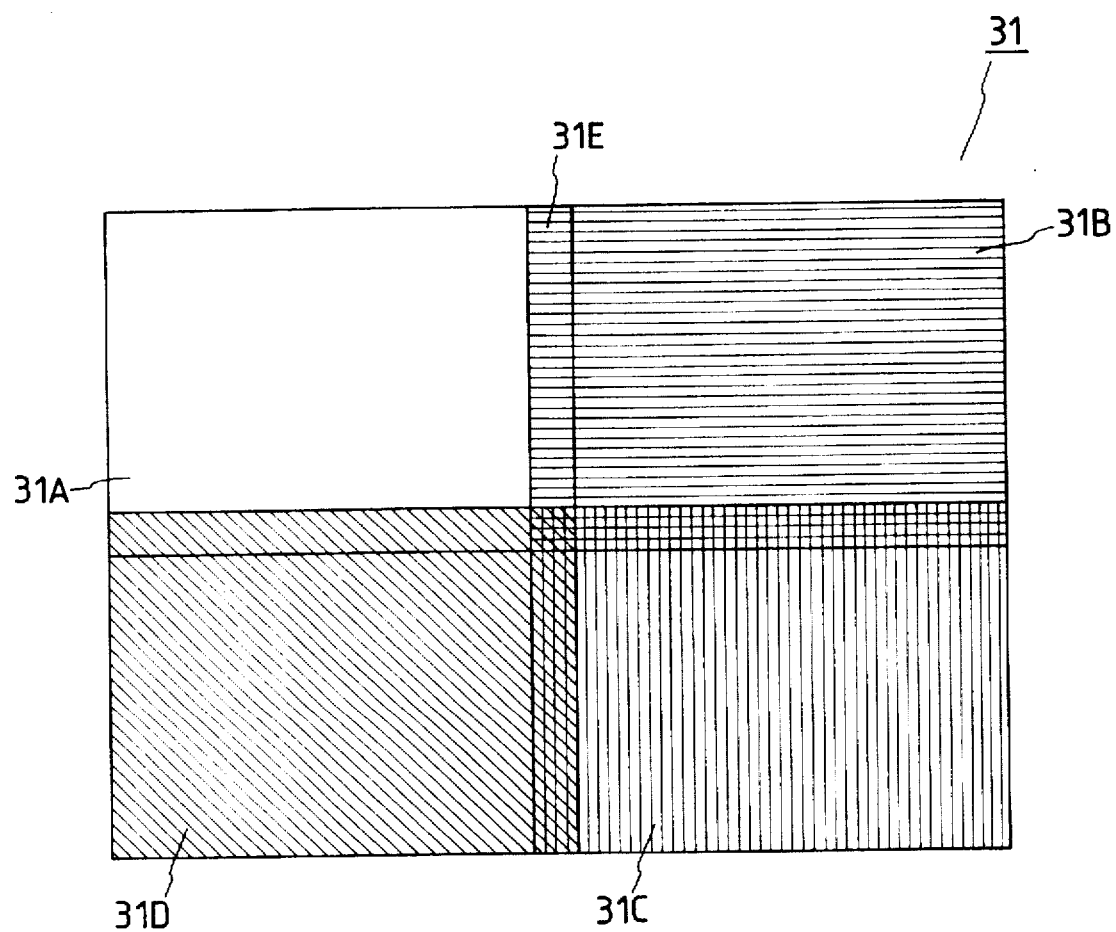
FIG. 7 is a synthesized view of image taking areas of the image taking means shown in FIG. 5.

FIG. 7 shows overlapping of the boundary portions, in the synthesis of divided images, formed on the four image sensor elements 31A–31D corresponding to the entire area of the object image.

For example, pixels in a boundary portion 31E of the image sensor elements 31A and 31B are contained in both elements 31A and 31B, and corresponding pixels are extracted at the synthesis by the signal processing unit, so that the image in such boundary portion can be released without interruption.

In the following the image processing method of the present embodiment will be explained with reference to FIGS. 8A and 8B, which are schematic block diagrams of the signal processing unit of the image taking apparatus of the present embodiment.

Figure 8A:
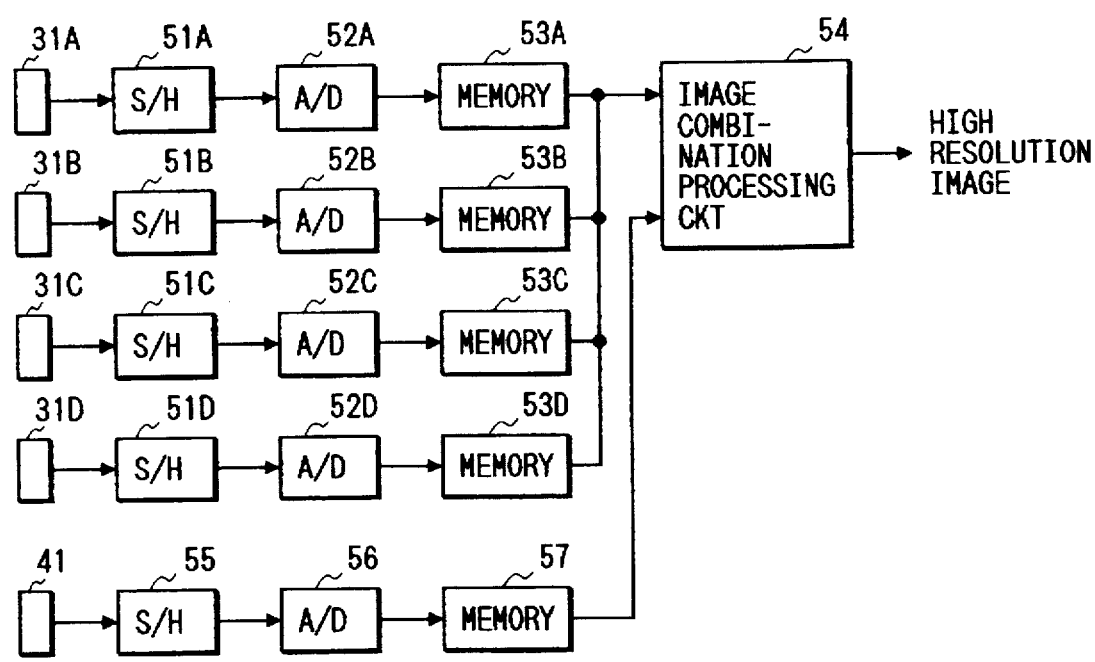
FIGS. 8A and 8B are block diagrams of the signal processing in the apparatus shown in FIG. 5.

In the present embodiment, in case of obtaining the image of high resolving power, electrical signals from the image sensor elements 31A–31D shown in FIG. 8A are retained by sample hold (S/H) circuits 51A–51D, then subjected to A/D conversion by analog-digital (A/D) conversion circuits 52A–52D, and stored in memory circuits 53A–53D. An image of a high resolving power is then obtained by reading information from the memories 53A–53D in an order enabling to constitute the entire image and synthesizing the information in an image combination processing circuit 54.

Also there is utilized, when required, an image which is supplied from the image taking means 41, then retained in a sample-hold circuit 55, further subjected to A/D conversion by an A/D conversion circuit 56 and stored in a memory 57.

Figure 8B:
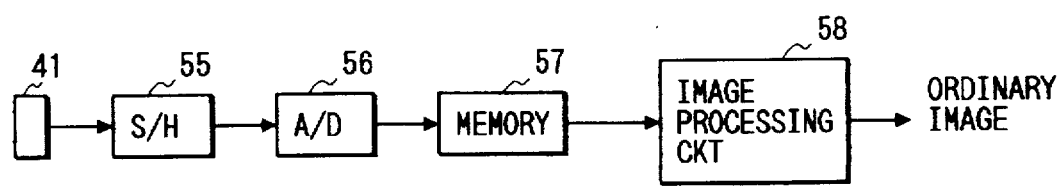

On the other hand, in case of obtaining the ordinary image not requiring the high resolving power, electrical signals from the image sensor element 41 shown in FIG. 8B are retained by the sample hold (S/H) circuit 55, then converted into digital signals by the A/D conversion circuit 56 and stored in the memory circuit 57, and such ordinary image is obtained by reading information from the memory 57 and processing the information in the image processing circuit.

FIG. 9 is a schematic view of the optical system of an embodiment 2 of the present invention, wherein same components as those in FIG. 1 are represented by same numbers.

The present embodiment is different from the foregoing embodiment 1 in that the optical path is split into two, by positioning a half mirror, serving as optical path splitting means, between the first optical unit 1 and the second optical unit 2. Also an optical unit (hereinafter called fifth optical unit) 23, corresponding to the second optical unit 2, is provided in an optical path, in the vicinity of a focal position 22 which is optically substantially equivalent to the primary focal plane 21, and the fourth optical unit 4 and the image taking means 41 are provided behind the fifth optical unit 23, while the optical unit 3 is provided in the other optical path. Other configurations and the optical functions are similar to those in the foregoing embodiment, and there can be obtained similar effects.

The above-explained optical arrangement of the present embodiment prevents eclipse of the light beam and ensures larger freedom in the arrangement of the components. Also appropriate pupil imaging relationship can be established in the axial and off-axial positions, as the refractive powers of the lenses can be independently selected in the second optical unit 2 and the fifth optical unit 23.

The present embodiment employs a half mirror as the optical path splitting means, but there may be instead employed, for example, a rotatable mirror, whereby the light can be guided to the image sensor elements without loss in the light amount.

In the present embodiment, the entire image area of the object image is divided into four and thus divided images are combined by the signal processing unit to obtain an image of a high resolving power, but the number of the lens units constituting the third optical unit and the number of corresponding image sensor elements may be arbitrarily increased in order to increase the practical number of pixels, whereby a further increase in the resolving power of the image can be achieved.

Also in case of a still image, the aforementioned pixel displacement method may be used in combination, in order to achieve further improvement in the resolving power.

Figure 10:
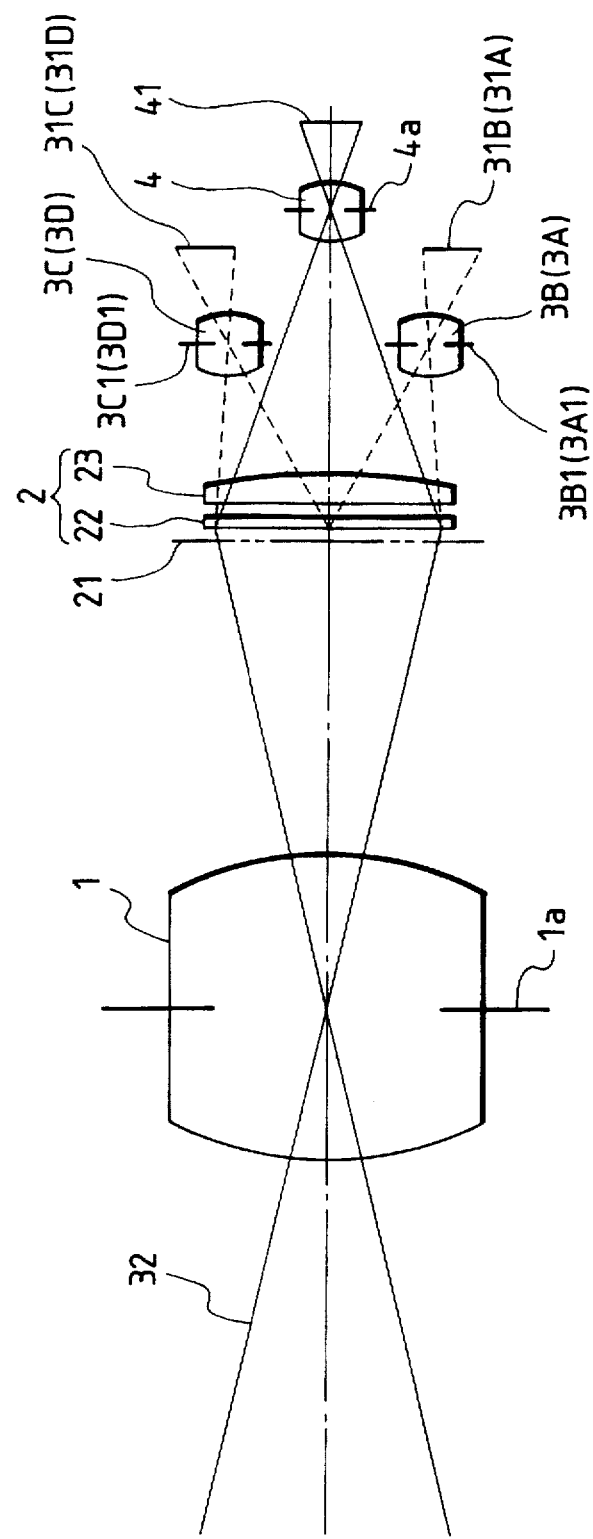

For achieving effective matching of the pupil positions between the optical units 3, 4 and the first optical unit 1, it is desirable, as shown in FIG. 10, to position a deflecting element 22 in the vicinity of the primary focal plane 21.

A second optical unit 2, positioned on the optical axis of the first optical unit 1 in the vicinity of the primary focal plane 21, is composed of a deflecting element 22 serving as a first optical member of which light beam directing ability varies according to the incident position, and a field lens 23 serving as a second optical member of a positive refractive power, and serves to guide the light beam from the object image, formed on the primary focal plane 21, to succeeding lens units.

The first optical member 22 of the second optical unit 2 realizes appropriate setting of the pupil position of the optical unit 4 and the pupil positions of the four lens units 3A–3D constituting the third optical unit 3.

Figure 11:
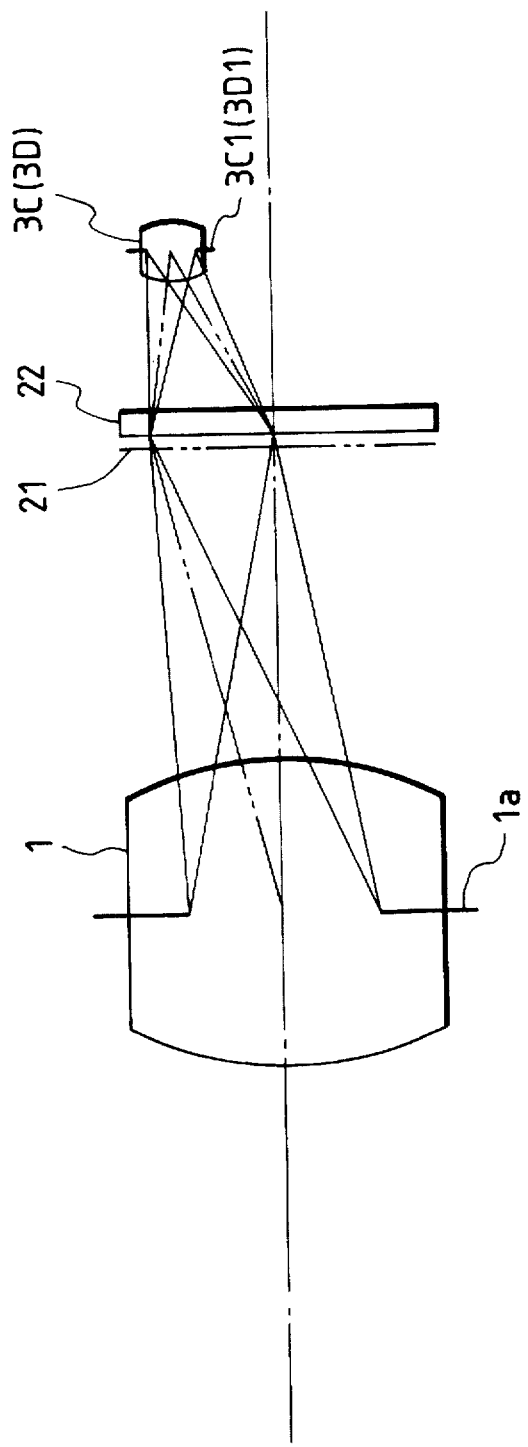
FIG. 11 is a view showing the optical function of the system shown in FIG. 10.

FIG. 11 is a schematic cross-sectional view showing the optical function of the deflecting element, constituting the first optical member 22, wherein same components as those in FIG. 10 are represented by same numbers.

Referring to FIG. 11, the first optical member 22 has the deflecting direction varying according to the incident position of the light beam, in such a manner that the pupil C3C (3D1) of the third optical unit 3 is focused on the optical axis of the first optical unit 1, and there is thus obtained appropriate relationship of the pupils.

The deflecting element 22 in the present embodiment may be composed, for example, of a translucent optical element provided with fine diffraction patterns, and the optical element is preferably formed at least on a face of the field lens 23, in order to achieve compactization of the entire apparatus.

In the following there will be explained, with reference to FIGS. 12 and 13, an embodiment provided with optical low-pass filters between the optical units and the image taking means, in order to eliminate noise components such as by Moire fringes.

First optical filter means 42, composed of an optical low-pass filter and positioned behind the optical unit 4, serves to limit the high spatial frequency components of the object image, thereby suppressing the repetitive noises such as Moire fringes, generated by the sampling operation of the image taking means 41 as will be explained later.

Second optical filter means 32, composed of four optical low-pass filters 32A, 32B, 32C, 32D positioned behind the four lens units 3A, 3B, 3C, 3D of the optical unit 3, serves to limit the high spatial frequency components of the object image, thereby suppressing the repetitive noises such as Moire fringes, generated by the sampling operation of the image taking means 41.

The optical low-pass filter employed in the present embodiment is composed of a double refracting member, utilizing double refraction, composed for example of quartz, and serves to generate optical blur in a spatial frequency range but to remain as transparent as possible to the spatial frequencies positioned lower than the frequency range. Desired low-pass characteristics are obtained by a variation in the thickness of the optical low-pass filter or in the direction of axis of the double refraction thereof, and/or by a combination of plural double refracting plates. In the present embodiment, the optical low-pass characteristics respectively for the image sensor elements 41, 31A, 31B, 31C and 31D.

The image processing method of the present embodiment will not be explained, as it is similar to that already explained in relation to FIGS. 8A and 8B.

Figure 12:
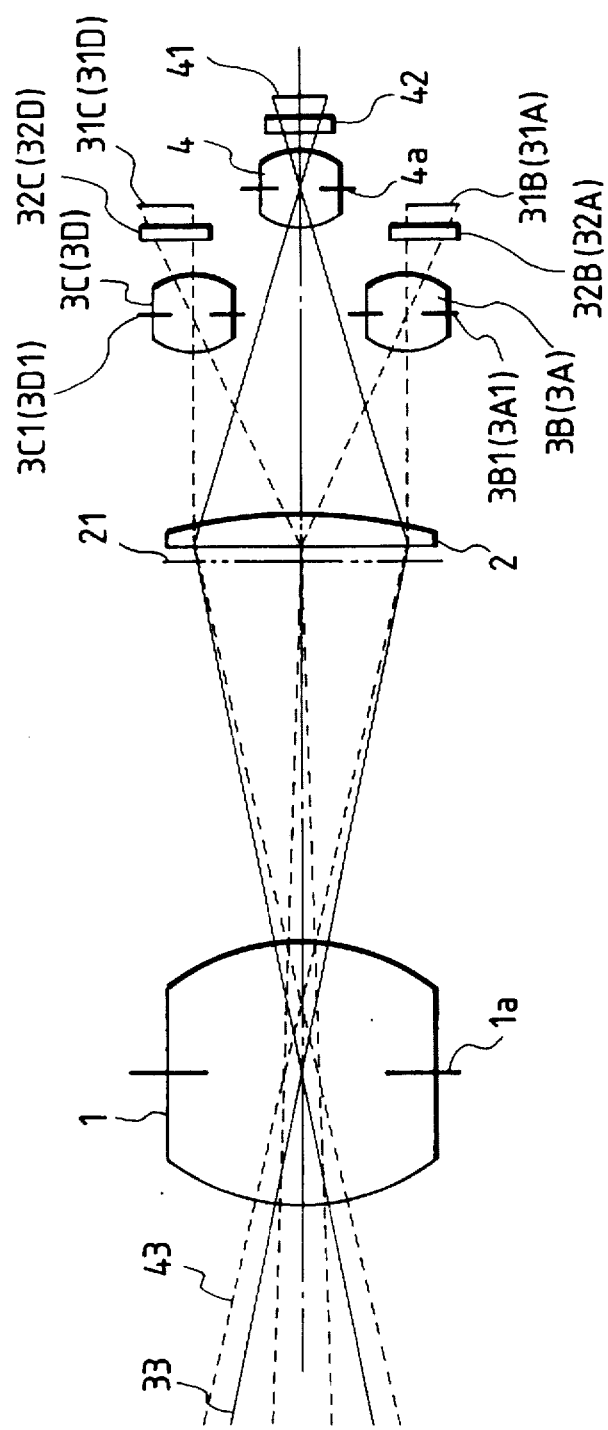
FIG. 12 is a cross-sectional view of the optical system of another embodiment of the present invention.
Figure 13:
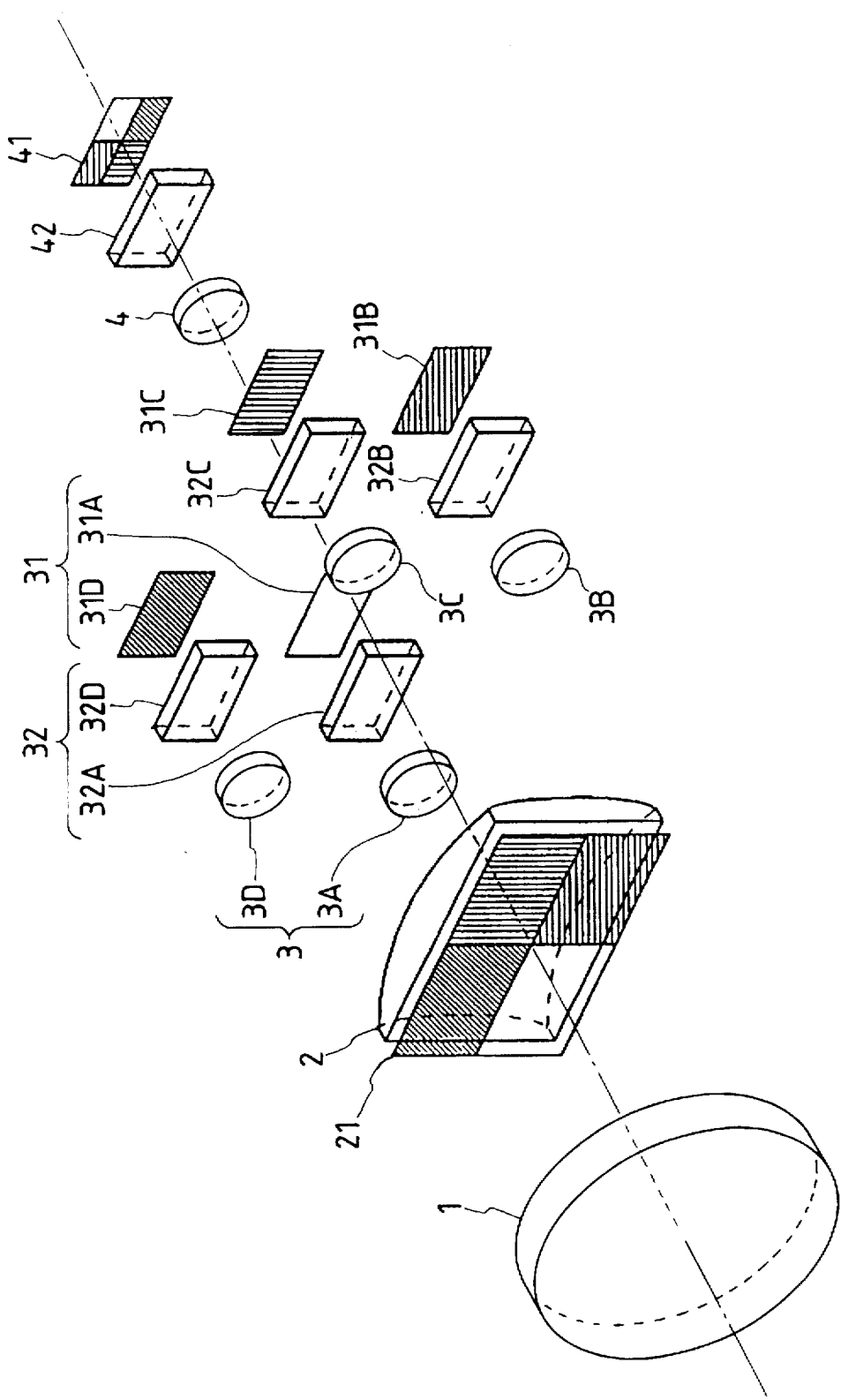
FIG. 13 is a perspective view of the optical system shown in FIG. 12.
Figure 14:
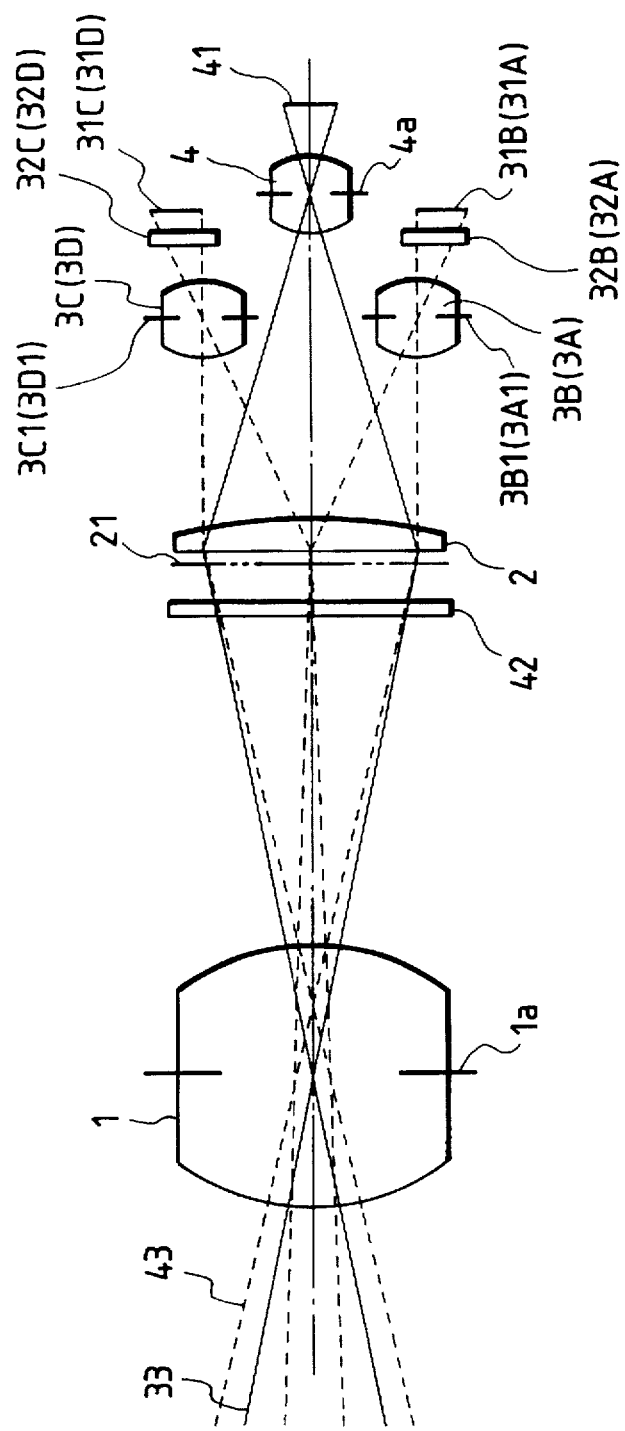
FIGS. 14 to 18 are cross-sectional views of the optical system of other embodiments of the present invention.

FIG. 14 is a schematic cross-sectional view of the optical system of another embodiment of the present invention, wherein same components as those in FIG. 12 are represented by same numbers.

The present embodiment is different from the foregoing one in that the optical low-pass filter, constituting the first optical filter means 42 positioned behind the optical unit 4 is positioned on the optical path between the first optical unit 1 and the second optical unit 2, and the plural optical low-pass filters 32A–32D constituting the second optical filter means 32 positioned behind the optical unit 3 are so designed as to provide, in combination with said first optical filter means 42, the optimum low-pass characteristics for the plural image sensor elements 31A–31D constituting the image taking means 31. Other configurations and the optical functions are similar to those in the foregoing embodiment, and there can thus be obtained similar effects.

Figure 15:
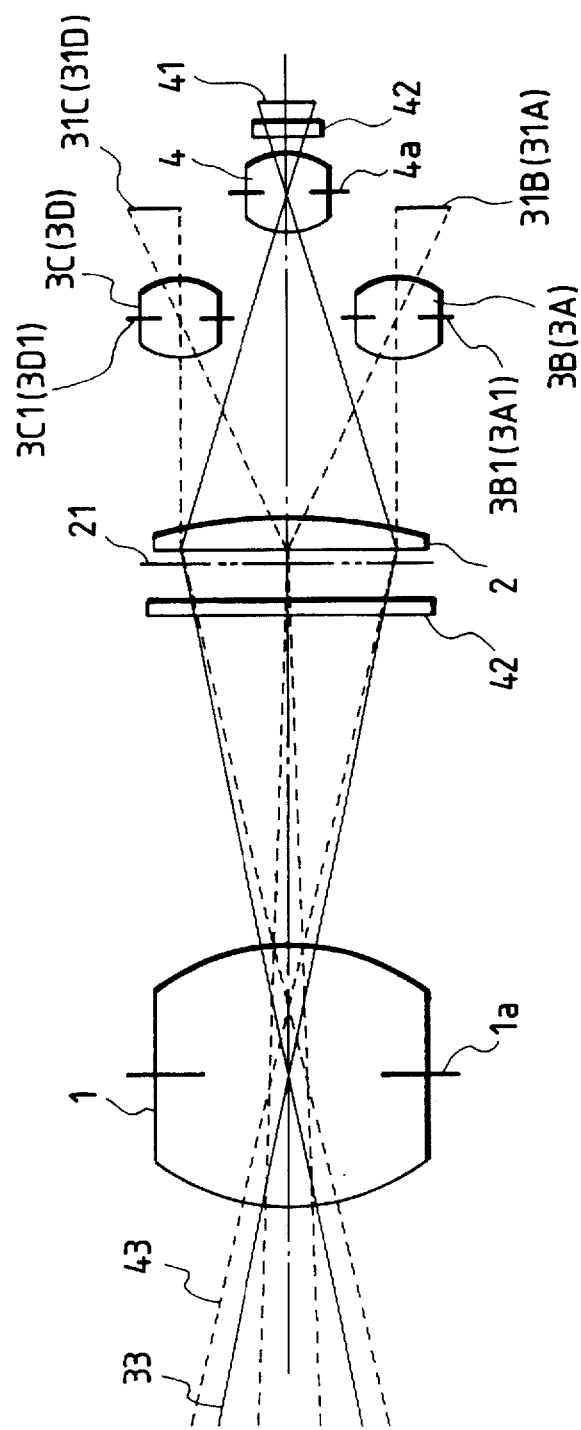

FIG. 15 is a schematic cross-sectional view of the optical system of another embodiment of the present invention, wherein same components as those in FIG. 12 are represented by same numbers.

The present embodiment is different from the foregoing one in that the plural optical low-pass filters 32A–32D, constituting the second optical filter means 32 positioned behind the plural lens units 3A–3D of the optical unit 3 are unified and positioned on the optical path between the first optical unit 1 and the second optical unit 2, and the optical low-pass filter constituting the first optical filter means 42 positioned behind the optical unit 4 is so designed as to provide, in combination with said second optical filter means 32, the optimum low-pass characteristics for the image taking means 41.

The above-explained optical arrangement of the present embodiment allows to reduce the number of the optical low-pass filters in comparison with those in the foregoing embodiment, thereby achieving simplification and cost reduction of the entire apparatus. Other configurations and the optical functions are similar to those in the foregoing embodiment, and similar effects can thus be attained.

Both the first optical filter means 42 and the second optical filter means 32 may be positioned on the optical path between the first optical unit 1 and the second optical unit 2. In such case the optical low-pass filters constituting the optical filter means 42, 32 should be designed to provide optimum low-pass characteristics for the respectively corresponding image sensor elements 41, 31A, 31B, 31C and 31D.

Figure 16:
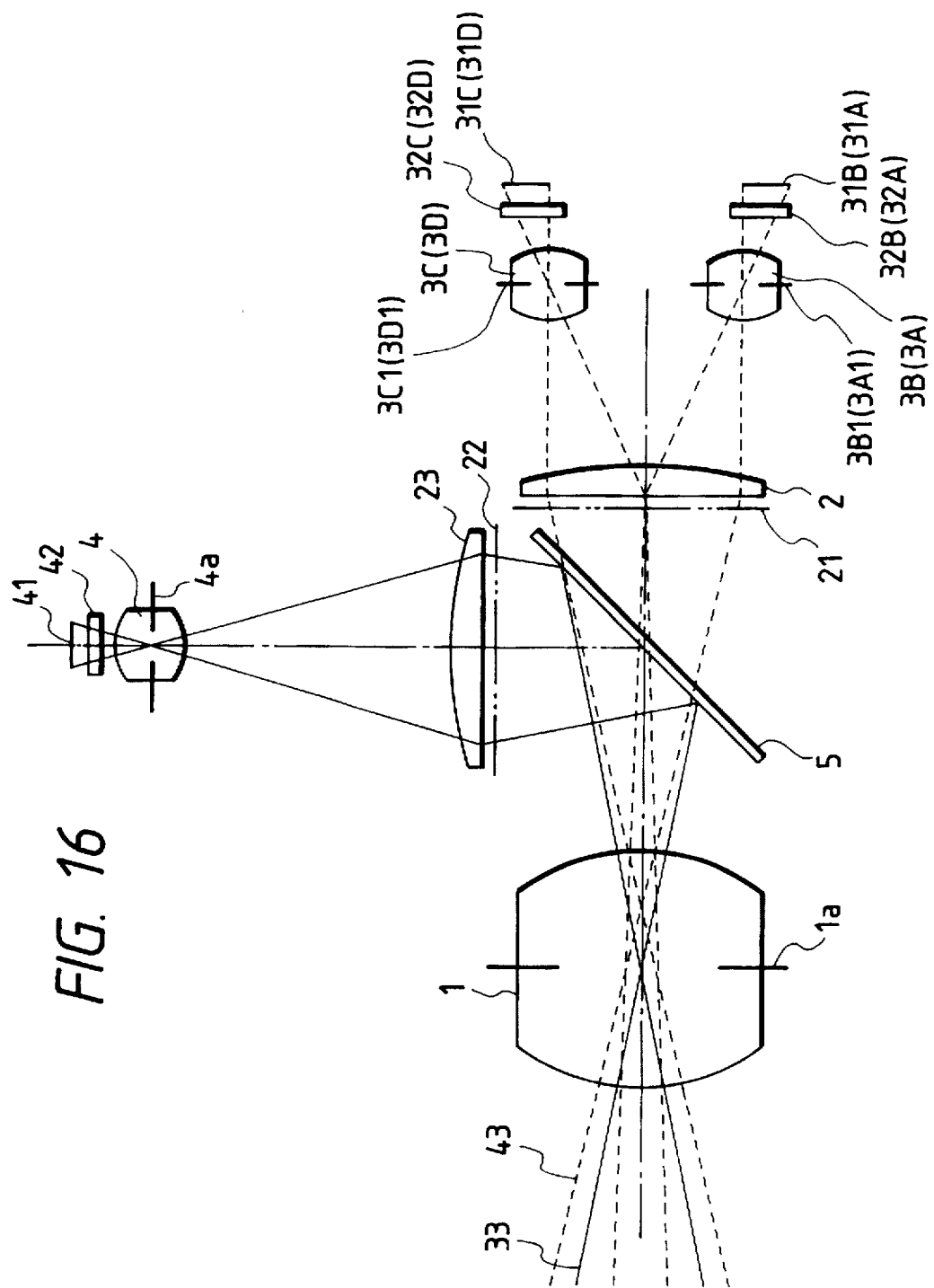

FIG. 16 is a schematic cross-sectional view of the optical system of still another embodiment of the present invention, wherein same components as those in FIG. 12 are represented by same numbers.

The present embodiment is different from the foregoing one in that the optical path is split into two, by positioning a half mirror, serving as optical path splitting means, between the first optical unit 1 and the second optical unit 2. Also an optical unit (hereinafter called fifth optical unit) 23, corresponding to the second optical unit 2, is provided in an optical path, in the vicinity of a focal position 22 which is optical substantially equivalent to the primary focal plane 21, and the fourth optical unit 4, the first optical means 42 and the image taking means 41 are provided behind said fifth optical unit 23, while the optical unit 3 is provided in the other optical path. Other configurations and the optical functions are similar to those in the foregoing embodiment, and there can thus be obtained similar effects.

The above-explained optical arrangement of the present embodiment prevents eclipse of the light beam and ensures larger freedom in the arrangement of the components. Also appropriate pupil imaging relationship can be established in the axial and off-axial positions, as the refractive powers of the lenses can be independently selected in the second optical unit 2 and in the fifth optical unit 23.

Figure 17:
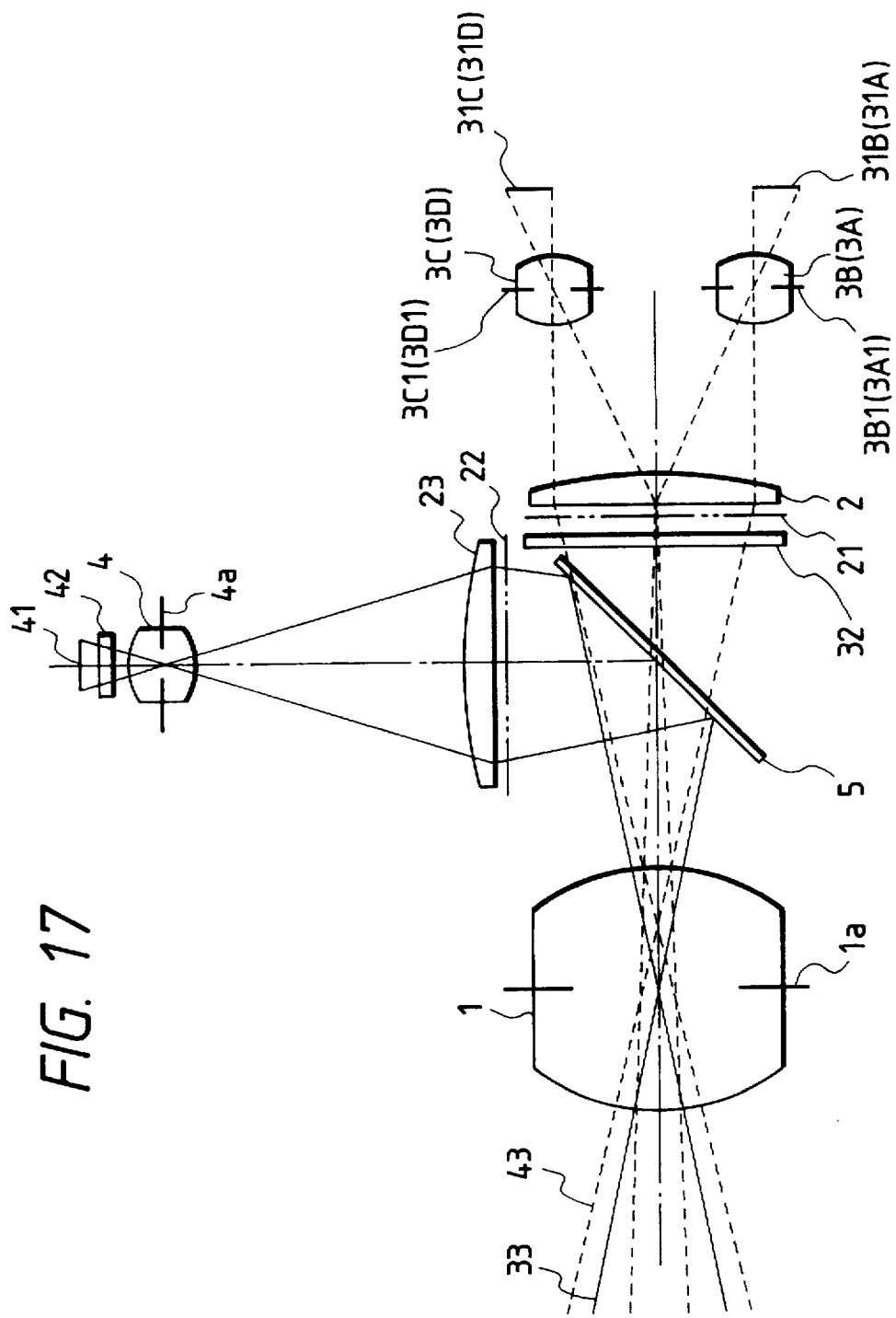

FIG. 17 is a schematic cross-sectional view of the optical system of still another embodiment of the present invention, wherein same components as those in FIG. 16 are represented by same numbers.

The present embodiment is different from the foregoing one in that the plural optical low-pass filters 32A–32D constituting the second optical filter means 32 positioned behind the plural lens units 3A–3D of the optical unit 3 are unified and positioned in the optical path between the light path splitting means 5 and the second optical unit 2.

Thus the present embodiment reduces the number of the optical low-pass filters in comparison with that in the foregoing embodiment, thereby achieving simplification and cost reduction of the entire apparatus. Other configurations and optical functions are similar to those in the foregoing embodiment, and there can thus be obtained similar effects.

It is also possible to position the second optical filter means 52 between the first optical unit 1 and the optical path splitting means 5, and, in such case, the first optical filter 42 positioned behind the optical unit 4 should be so designed as to provide, in combination with the optical filter means 32, optimum low-pass characteristics for the image taking means 41.

It is also possible to position the optical filter means 42 in the optical path between the first optical unit 1 and the optical path splitting means 5, and, in such case, the second optical filter means 32 should be so designed as to provide, in combination with the optical filter means 42, optimum low-pass characteristics respectively for the plural image sensor elements 31A–31D constituting the image taking means 31.

The half mirror employed as the optical path splitting means in the foregoing embodiments may be replaced for example by a rotatable mirror, which allows to guide the light to the image sensor elements without decrease in the light amount.

Also in the foregoing embodiments, the optical low-pass filter is composed of an optical element utilizing double refraction, composed for example of quartz, but the present invention is likewise applicable in case it is composed of a phase diffraction grating.

In the foregoing embodiments, the entire image area of the object image is divided into four and thus divided images are combined by the signal processing unit to obtain an image of a high resolving power, but the number of the lens units constituting the third optical unit and the number of corresponding image sensor elements may be arbitrarily increased in order to increase the practical number of pixels whereby a further increase in the resolving power of the image can be achieved.

In the following there will be explained an embodiment allowing to provide an image of a high resolving power by an improvement in the arrangement of color filters to be positioned in front of the image taking means.

Figure 18:
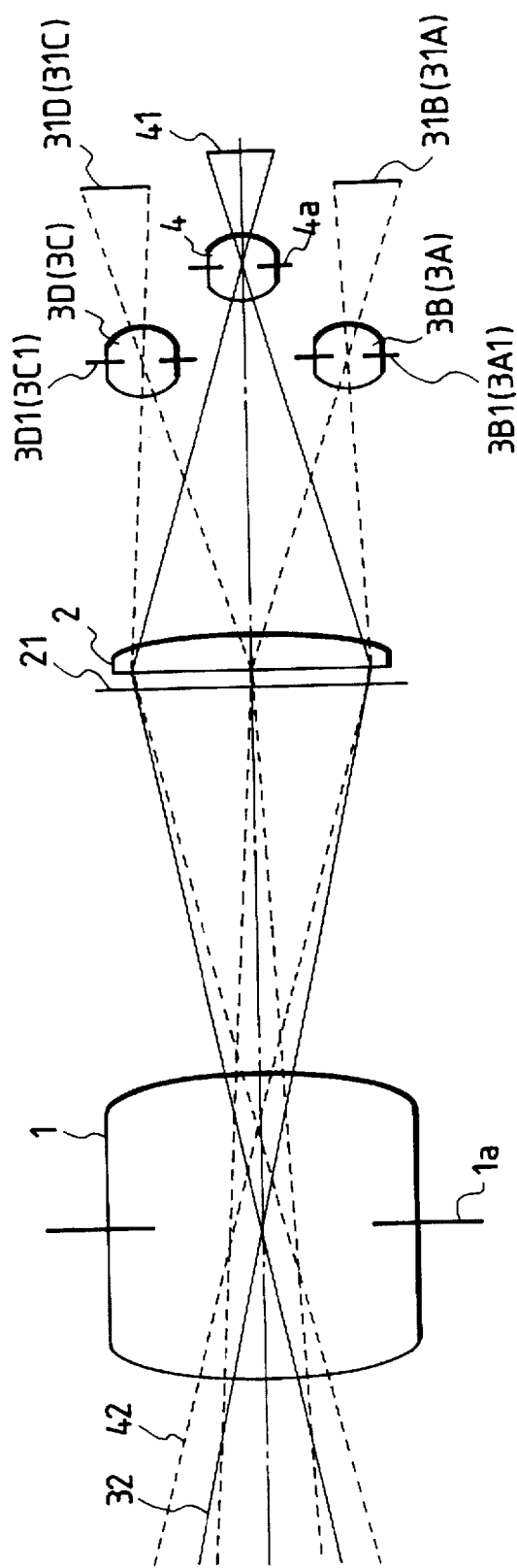

FIG. 18 is a schematic cross-sectional view of the optical system of the embodiment, and FIG. 19 is a perspective view thereof. Components having same numbers as explained before will not be explained further as the perform equivalent function.

In this embodiment, the image taking means 41 is provided thereon with a color filter, consisting of color filters, alternately arranged in the main and such scanning directions (horizontal and vertical directions), of red (R) and blue (B) colors of the spectral characteristics visually not requiring high resolving power, as shown in FIG. 20B.

On the other hand, on the image sensor elements 31A–31D, there are provided, as shown in FIG. 20A, color filters of green (G) color, visually requiring a high resolving power.

In the following there will be explained the image processing method of the present embodiment with reference to FIG. 21, which is a block diagram of an image signal processing unit of the image taking apparatus of the present embodiment.

Image sensor elements 31A, 31B, 31C, 31D are respectively provided thereon with the above-explained color filters as shown in FIGS. 20A and 20B.

In the present embodiment, the object image focused with area division on the four image sensor elements 31A–31D of the imaging taking means 31 is released as electrical signals (G signals) from the image sensor elements 31A–31D, and the signals are retained in sample hold (S/H) circuits 51A–51D, then converted into digital signals by analog-digital (A/D) conversion circuits 53A–53D and stored in memory circuits 55A–55D.

Also the entire object image focused on the image taking means 41 is released therefrom as electrical signals (alternate R and B signals), which are retained in sample hold (S/H) circuits 52A, 52B, then converted into digital signals by analog-digital (A/D) conversion circuits 54A, 54B and stored in memory circuits 56A, 56B.

The G signals stored in divided manner in the memories 55A–55D are read in an order allowing to constitute the entire image frame and are supplied to a luminance signal processing circuit 57 and a color signal processing circuit 58. Also the R and B signals stored in the memories 56A, 56B are supplied to the color signal processing circuit 58.

The luminance signal processing circuit 57 effects necessary signal processing, such as auto gain control (AGC) and gamma correction, on the G signals, thereby releasing luminance signals. The color signal processing circuit 58 effects signal processing such as AGC, gamma correction and white balance adjustment on the entered R, G and B signals, and generates color difference signals through a matrix process. Color image signals for color reproduction are obtained from these signals.

The obtained luminance and color difference signals may be converted, if necessary, into analog signals by a digital-analog conversion circuit, or may be converted into a composite image signal by an encoder circuit.

In the present embodiment, the image sensor elements 31A, 31B, 31C, 31D and 41 have a same number of pixels, and the image signal of a low frequency region is formed, by the signal processing unit, from the image taking means 41 while the image signal of a high frequency region is obtained from the plural image sensor elements 31A–31D constituting the image taking means 31. In particularly, the luminance signal can be provided with a higher resolving power in comparison with that of the conventional image taking apparatus, as it is formed from the output signals of the plural image sensor elements 31A–31D constituting the image taking means 31.

In the present embodiment, the arrangement of the color filters provided on the image sensor elements 41, 31A–31D are not limited to that shown in FIGS. 20A and 20B, but the present invention is likewise applicable to any filter arrangement, as exemplified in FIGS. 22A, 22B, 23A, 23B, 24A, 24B, 25A and 25B, as long as there can be obtained luminance signal and color signal components.

In the arrangement shown in FIGS. 22A and 22B, green (G) filters are provided on the image taking means 31 (31A–31D), while color filters consisting of alternate arrangement in the main scanning direction of red (R) and blue (B) filters are provided on the image taking means 41. In the arrangement shown in FIGS. 23A and 23B, the image taking means 31 (31A–31D) is provided thereon with yellow (Y) filters, while the image taking means 41 is provided thereon with red (R) and blue (B) filters arranged alternately in the main and sub scanning directions. In the arrangement shown in FIGS. 24A and 24B, the image taking means 31 (31A–31D) is provided thereon with yellow (Y) filters, while the image taking means 41 is provided with red (R) and blue (B) filters arranged alternately in the main scanning direction. Also in the arrangement shown in FIGS. 25A and 25B, the image taking means 31 (31A–31D) is provided thereon with white (W) filters, while the image taking means 41 is provided with red (R), green (G) and blue (B) filters arranged cyclically in the main scanning direction.

In case of the filter arrangement shown in FIGS. 25A and 25B, the image can be obtained from the signal of the image taking means 41, in case a high resolving power is not required.

Also in the present embodiment, a part of the object image can be selectively used, by selecting a part of the four image sensor elements 31A–31D constituting the image taking means 31.

In the present embodiment, the optical unit 3 is composed of four lens units 3A–3D, but such number of division is not limitative and can be arbitrarily selected as long as the entire area of the object image can be divided into plural areas with plural lens units. In particular, the color image of a higher resolving power can be obtained by constituting the optical unit 3 with five or more lens units.

Furthermore the number of pixels of the image taking means 41 need not be same as that of the plural image sensor elements 31A–31D constituting the image taking means 31, and, if the number of pixels of said plural image sensor elements 31A–31D is selected larger than that of the image taking means 41, the optical unit 3 may be composed of a single lens unit.

In contrast to the conventional image taking apparatus, the present embodiment can achieve use of plural image sensor elements and capture of color image without the expensive color separation means such as dichroic mirrors or half mirrors, thereby avoiding limitation on the back focus of the phototaking lens, by appropriate setting the components of the image taking apparatus as explained in the foregoing, also taking the low frequency region of the object image with the image taking means 41 positioned at the focal plane of the optical unit 4 and taking the high frequency region of the object image with the plural image sensor elements 31A–31D constituting the image taking means 3.

FIGS. 26A and 26B illustrate an arrangement of the color filters, provided on the image taking means 41 and on the plural image sensor elements 31A–31D constituting the image taking means 31 in the foregoing embodiment.

This embodiment is different from the foregoing one in that the plural image sensor elements 31A–31D, constituting the image taking means 31, are composed of line sensors, which are put into scanning motion in the sub scanning direction to take the object image of the entire area. Other configurations and the optical functions are similar to those in the foregoing embodiment.

In this embodiment, the four image sensor elements 31A–31D constituting the image taking means 31 are composed of line sensors, which are provided with green (G) filters as shown in FIG. 26A. The object image, formed on the primary focal plane 21, are divided into four areas by the four lens units 3A–3D of the optical unit 3, and thus divided object image areas are respectively focused on the line sensors 31A–31D, which are respectively put into scanning motion in the sub scanning direction, whereby the object image of the entire area is taken, with area division, by said line sensors.

Then, as in the foregoing embodiment, the signals (image information) from the image taking means 41 and from the four image sensor elements 31A–31D constituting the image taking means 31 are processed in the image signal processing unit shown in FIG. 21, whereby obtained are luminance signal and color difference signals for color reproduction.

In the present embodiment, the number of pixels of each line sensor is selected several times larger than that of the ordinary area sensor in the main scanning direction, whereby the resolving power is made higher than in the conventional image taking apparatus.

In the present embodiment, the arrangement of the color filters provided on the image sensor elements is not limited to that shown in FIGS. 26A and 26B, but there can be adopted any filter arrangement, as exemplified in FIGS. 27A, 27B, 28A, 28B, 29A, 29B, 30A and 30B, as long as luminance and color difference signal components can be obtained. The filter arrangements shown in these drawings are similar to those shown before.

In particular, as in the foregoing embodiment, in case of the filter arrangement shown in FIGS. 30A and 30B, the image can be taken only with the image taking means 41 if a high resolving power is not required. In such case the scanning motion of the line sensors 31A–31D in the sub scanning direction can be dispensed with, so that a moving image can also be taken and the time required for image taking can also be shortened.

In the present embodiment, the optical unit 3 is composed of four lens units 3A, 3B, 3C and 3D, but the number of such lens units is not limited to four. There can be employed only one lens unit or lens units of any number as long as the entire area of the object image can be taken with area division.

In the following there will be shown another arrangement of the filters. In this embodiment the first image taking means 41 is provided, as shown in FIG. 31A, with filters of green (G) color visually requiring a high resolving power, while the image sensor elements 31A–31D are provided, as shown in FIG. 31B, with red (R) and blue (B) filters, visually requiring a high resolving power, arranged alternately in the main (horizontal) scanning direction and in the sub (vertical) scanning direction.

In the present embodiment, the number of pixels of the image taking means 41 is selected larger than that of the plural image sensor elements 31A–31D constituting the image taking means 31, whereby, as will be explained later, the image taking means 41 generates the image signal of the high frequency region while the plural image sensor elements 31A–31D constituting the image taking means 31 generates the image signal of the low frequency region.

The color image signals for color reproduction are then obtained from the output signals of the image taking means 41 and of the plural image sensor elements 31A–31D constituting the image taking means 31.

Figure 32:
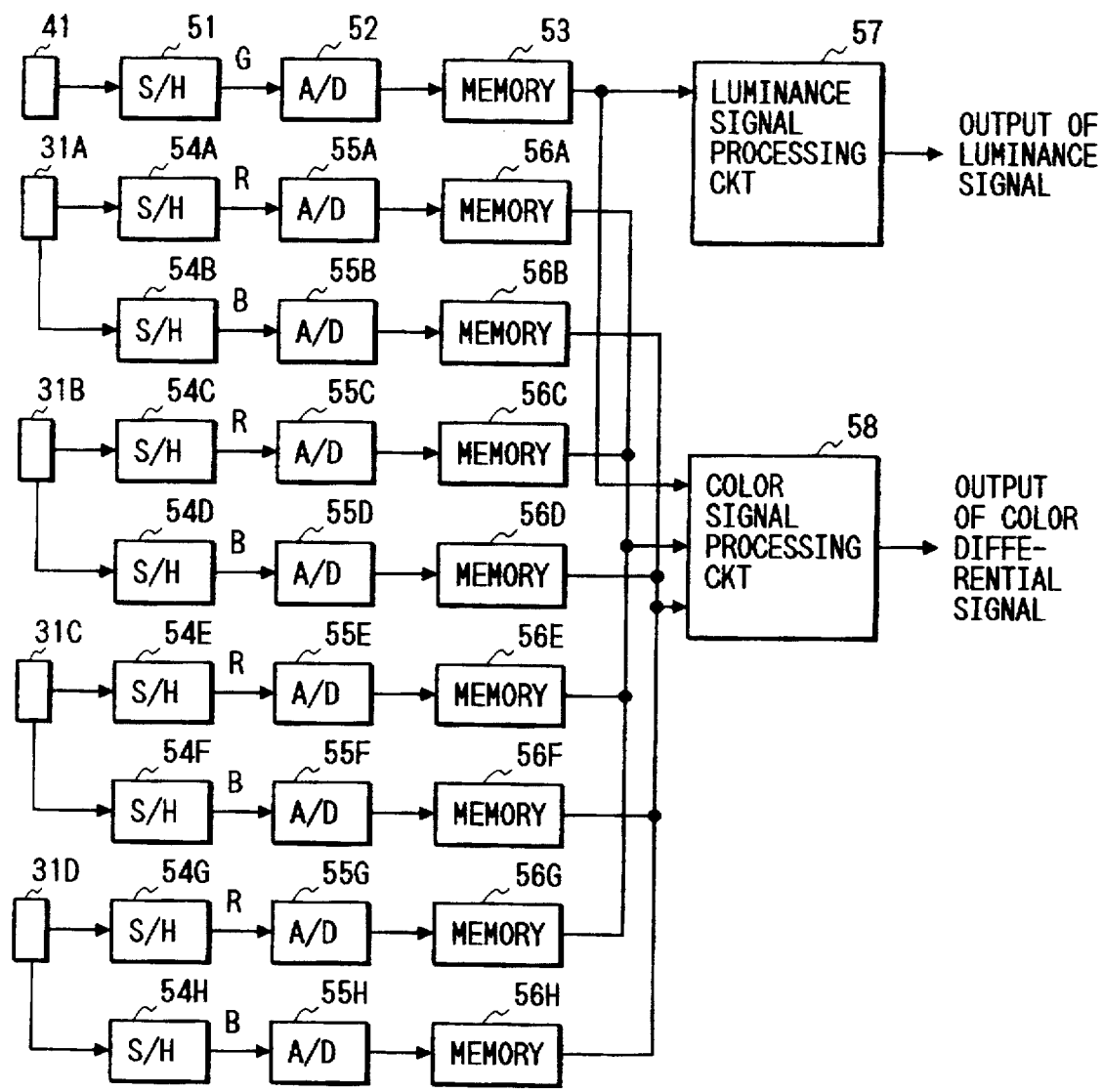
FIG. 32 is a block diagram showing the signal processing in the present invention.

In the following the image processing method of the present embodiment will be explained with reference to FIG. 32, which is a block diagram of the image signal processing unit of the image taking apparatus of the present embodiment.

Image sensor elements 41, 31A, 31B, 31C and 31D are respectively provided with color filters as shown in FIGS. 31A and 31B.

In the present embodiment, the entire object image focused on the image taking means 41 is released therefrom as electrical signals (G signals), which are retained in a sample hold (S/H) circuit 51, then converted into digital signals by an analog-digital (A/D) conversion circuit 52 and stored in a memory circuit 53.

Also the object image focused, with area division, on the four image sensor elements 31A–31D constituting the image taking means 31 are released, from the image sensor elements, as electrical signals (alternate R and B signals), which are retained, at the timings or the R and B signals, by sample-hold (S/H) circuits 54A–54H, whereby the signals are separated into R and B signals. Then the signals are converted into digital signals by analog-digital (A/D) conversion circuits 55A–55H, and are stored in memory circuit 56A–56H.

The G signals stored in the memory 53 are supplied to a luminance signal processing circuit 57 and a color signal processing circuit 58. Also the R and B signals, stored with area division in the memories 56A–56H are read therefrom in the order enabling reconstruction of the entire image, and are supplied to the color signal processing circuit 58. The luminance signal processing circuit 57 effects necessary signal processing, such as auto gain control (AGC) and gamma correction, on the G signals, thus generating luminance signals.

The color signal processing circuit 58 effects signal processing, such as AGC, gamma correction and white balance adjustment, on the entired R, G and B signals, and generates color difference signals through a matrix process. These signals are used for generating color image signals for color reproduction.

The luminance and color difference signals thus released may be converted, if necessary, into analog signals by a D/A conversion circuit, or may be converted into a composite image signal by an encoder circuit.

The present embodiment can provide a resolving power higher than in the conventional image taking apparatus, as the luminance signals are formed from the signals obtained by the image taking means 41 of a larger number of pixels.

Since the color signals require a narrower frequency region, they are formed from the output signals of the four image sensor elements 31A–31D of a less number of pixels, in comparison with the image taking means 41. Thus, in comparison with the conventional multi-sensor image taking apparatus, a higher resolving power can be attained without the use of expensive image sensor elements of a large number of pixels.

Besides the use of plural sensor elements and the capture of color image can be attained without the use of expensive color separating optical elements such as dichroic prisms or half mirrors, and the restriction on the back focus of the phototaking lens can be eliminated.

In the present embodiment, the arrangement of the color filters provided on the image taking means 41 and the plural image sensor elements 31A–31D constituting the image taking means 31 is not limited to that shown in FIGS. 31A and 31B, but the present invention is applicable to any filter arrangement as exemplified in FIGS. 33A, 33B, 34A, 34B, 35A, 35B, 36A and 36B, as long as luminance and color signal components can be obtained.

More specifically, in case of the arrangement shown in FIGS. 33A and 33B, the image taking means 41 is provided thereon with green (G) filters, while the image taking means 31 (31A–31D) is provided with red (R) and blue (B) filters arranged alternately in the main scanning (horizontal) direction. In the arrangement shown in FIGS. 34A and 34B, the image taking means 41 is provided thereon with yellow (Y) filters, while the image taking means 31 (31A–31D) is provided with red (R) and blue (B) filters arranged alternately in the main scanning direction and in the sub scanning (vertical) direction. In the arrangement shown in FIGS. 35A and 35B, the image taking means 41 is provided with yellow (Y) filters, while the image taking means 31 (31A–31D) is provided with red (R) and blue (B) filters, arranged alternately in the main scanning direction. Also in case of the arrangement shown in FIGS. 36A and 36B, the image taking means 41 is provided with white (W) filters, while the image taking means 31 (31A–31D) is provided with red (R), green (G) and blue (B) filters, arranged cyclically in the main scanning direction.

In particular, in case of the filter arrangement as shown in FIGS. 36A and 36B, the image can be taken only with the image taking means 41 if a high resolving power is not required.

In the present embodiment, the optical unit 3 is composed of four lens units 3A, 3B, 3C and 3D, but the number of such lens units is not limited to four. There can be employed only one lens unit or lens units of any number as long as the entire area of the object image can be taken with area division. In particular a higher resolving power can be attained if the optical unit is composed of five or more lens units.

Figure 37:
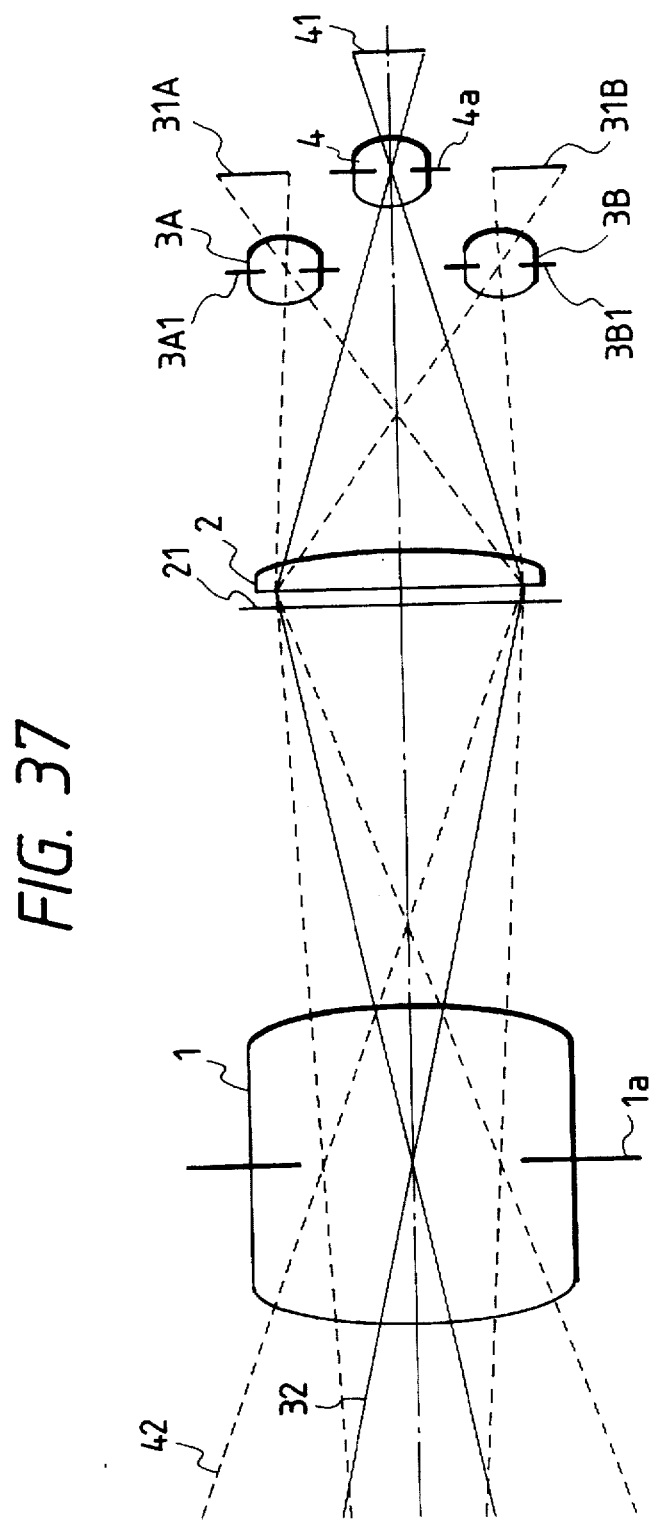
FIG. 37 is a cross-sectional view of the optical system of another embodiment of the present invention.
Figure 38:
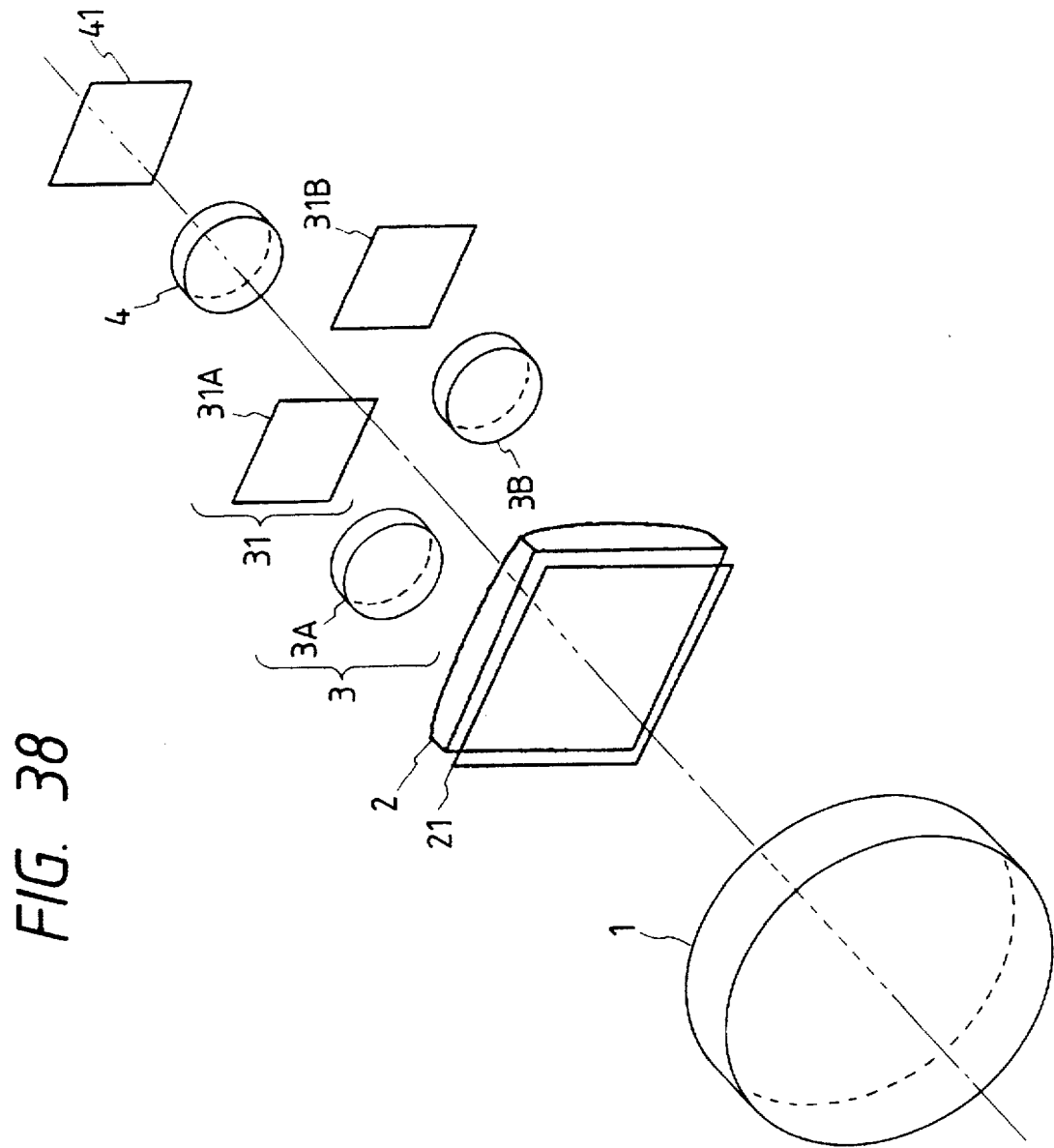
FIG. 38 is a perspective view of the optical system shown in FIG. 37.

FIG. 37 is a schematic cross-sectional view of the optical system of another embodiment, and FIG. 38 is a perspective view thereof, wherein same components as those in the foregoing drawings are represented by same numbers.

Figures 39A, 39B, 39C, 40:
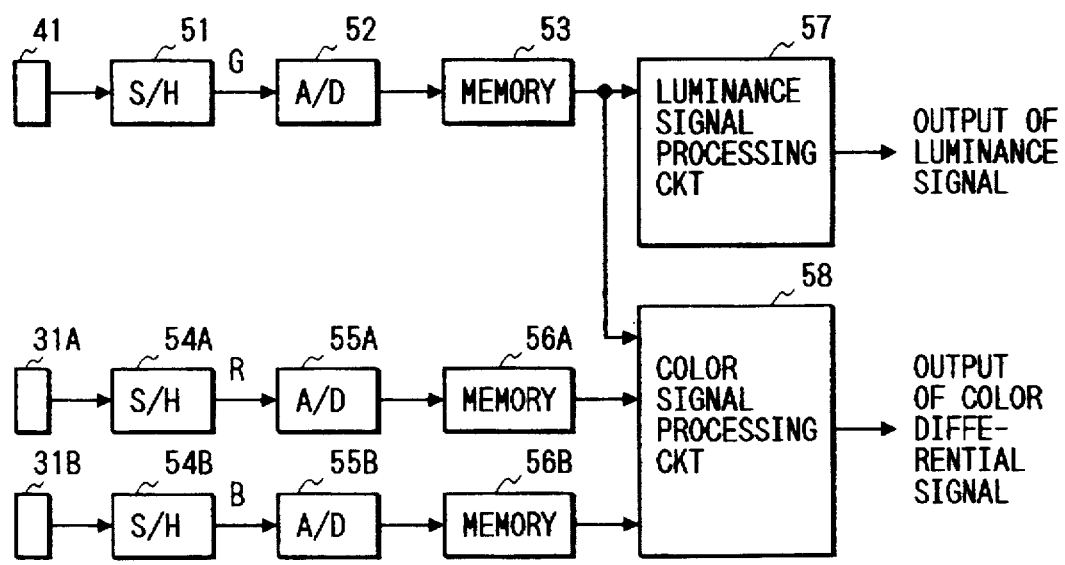
FIGS. 39A to 39C are views showing the arrangement of color filters in the present invention.
FIG. 40 is a block diagram showing the signal processing in the present invention.

The present embodiment is different from the foregoing embodiments in that the optical unit 3 is composed of two lens units 3A and 3B, and image sensor elements 31A, 31B constituting the image taking means 31 are respectively positioned on the focal planes of the two lens units 3A, 3B and are respectively provided with red (R) and blue (B) filters as shown in FIGS. 39B and 39C, wherein the object image formed on the primary focal plane 21 is entirely re-focused on the image sensor elements 31A, 31B and the color image signals for color reproduction are obtained by the signal processing unit, from the signals from said two image sensor elements 31A, 31B and the signal from the image taking means 41 positioned on the focal plane of the optical unit 4. Other configuration and the optical functions are similar to those in the foregoing embodiments.

In the present embodiment, the pupil 1a of the first optical unit 1 and the pupil 49 of the optical unit 3 are mutually maintained in a substantially conjugate relationship as indicated by solid-lined optical paths 32 in FIG. 37, and the pupils 3A1, 3B1 of the two lens units 3A, 3B constituting the optical unit 3 are so positioned as to be focused in the vicinity of the pupil area of the first optical unit 1, as indicated by broken-lined optical paths 42 in FIG. 37.

As shown in FIG. 38, the image of the object is focused by the first optical unit 1 on the primary focal plane 21, and the object image is entirely focused again on the image taking means 41 through the second optical unit 2 and the fourth optical unit 4. Also the object image is entirely focused again respectively on the two image sensor elements 31A, 31B constituting the image taking means 31, through the two lens units 3A, 3B constituting the optical unit 3. Then the color image signals for color reproduction are obtained, by a signal processing unit to be explained later, from the output signals (image information) of the image taking means 41 and the two image sensor elements 31A, 31B constituting the image taking means 31.

In the following the image processing method of the present embodiment will be explained with reference to FIG. 40, which is a block diagram of the image signal processing unit of the image taking apparatus of the present embodiment.

Image sensor elements 41 and 31A–31D are respectively provided with color filters as shown in FIGS. 39A to 39C.

In the present embodiment, the entire object image formed on the image taking means 41 is released therefrom as electrical signals (G signals), which are retained in a sample-hold (S/H) circuit 51, then converted into digital signals by an analog-digital (A/D) conversion circuit 52 and stored in a memory circuit 53.

Also the entire object image formed on the image sensor elements 31A, 31B constituting the image taking means 31 are released therefrom as electrical signals (R and B signals), which are retained in sample-hold (S/H) circuits 54A, 54B, then converted into digital signals by analog-digital (A/D) conversion circuits 55A, 55B and stored in memory circuits 56A, 56B.

The G signals stored in the memory 53 are supplied to the luminance signal processing circuit 57 and the color signal processing circuit 58. Also the R and B signals stored in the memories 56A, 56B are read therefrom and supplied to the color signal processing circuit 58. The luminance signal processing circuit 57 effects necessary signal processing, such as auto gain control (AGC) and gamma correction, on the G signals, thereby generating luminance signals.

The color signal processing circuit 58 effects signal processing such as AGC, gamma correction and white balance adjustment, on the entired R, G and B signals, and generates color difference signals through a matrix process. These output signals are used for obtaining the color image signals for color reproduction.

The present embodiment can attain a higher resolving power in comparison with the conventional image taking apparatus, as the luminance signal is obtained, as in the foregoing embodiments, from the signals from the image taking means 41 of a high number of pixels.

Since the dolor signals require a narrower frequency region, they are formed from the output signals of the four image sensor elements 31A-31D of a less number of pixels, in comparison with the image taking means 41. Thus, in comparison with the conventional multi-sensor image taking apparatus, a higher resolving power can be attained without the use of expensive image sensor elements of a large number of pixels.

Besides the use of plural sensor elements and the capture of color image can be attained without the use of expensive color separating optical elements such as dichroic prisms or half mirrors, and the restriction on the back focus of the phototaking lens can be eliminated.

Furthermore the circuit configuration of the color signal processing unit in the present embodiment can reduce the capacities of the memories, because the number of pixels of the image sensor elements is less than that of such elements employed in the conventional apparatus. Besides the reduced driving frequency for the S/H circuits and A/D conversion circuits allows to further simplify the circuits and reduce the power consumption.

The arrangement of the color filters provided on the image sensor elements of the present embodiment is not limited to that shown in FIGS. 39A to 39C, but the present invention is likewise applicable to any filter arrangement, as exemplified in FIGS. 41A, 41B and 41C, as long as luminance and color signal components can be obtained.

In the arrangement shown in FIGS. 41A, 41B and 41C, the image taking means 41 is provided thereon with yellow (Y) filters, while the image sensor element 31A of the image taking means 31 is provided with red (R) filters, and the image sensor element 31B of the image taking means 31 is provided with blue (B) filters, whereby attained are effects similar to those in the foregoing embodiment.

FIGS. 42A and 42B illustrate another embodiment of the arrangement of color filters provided on the image taking means 41, 31.

The present embodiment, constituting an improvement on the foregoing embodiment, is different therefrom in that the optical unit 3 is composed of a single lens unit 3A while an image sensor element 31A is provided, as the image taking means, on the focal plane of the lens unit 3A, and the image sensor element 31A is provided thereon with red (R) and blue (B) filters arranged alternately, as shown in FIG. 42B, in the main and sub scanning directions. The present invention is also likewise applicable to the present configuration employing only one optical unit 3 and only one image sensor element corresponding thereto. Other configurations and the optical functions are similar to those in the foregoing embodiments.

Figure 43:
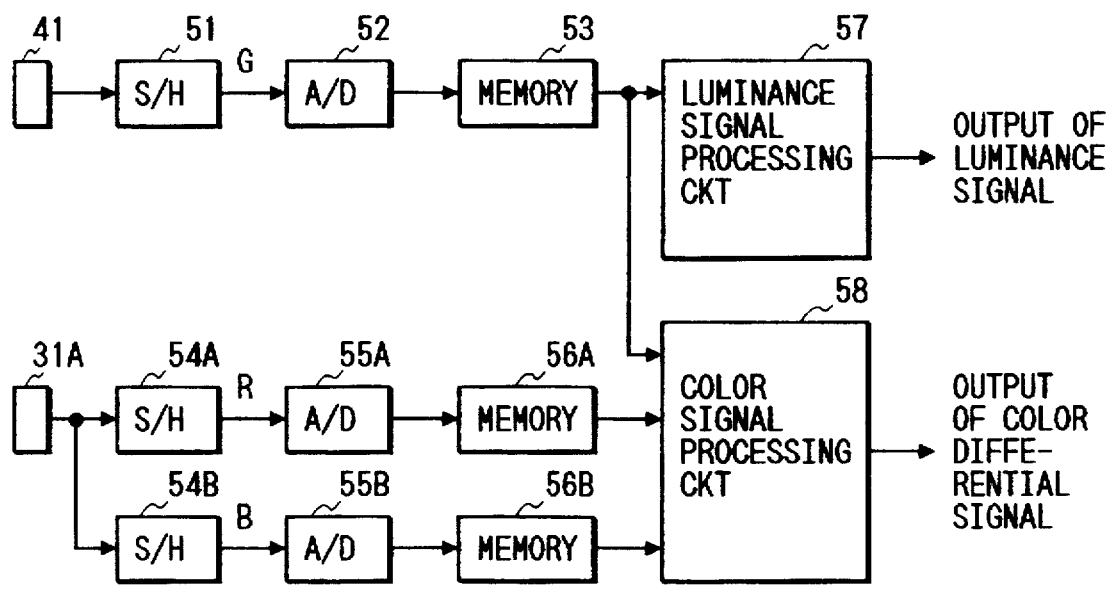
FIG. 43 is a block diagram showing the signal processing in the present invention.

In the following the image processing method of the present embodiment will be explained with reference to FIG. 43, which is a block diagram of the image signal processing unit of the image taking apparatus of the present embodiment.

Image sensor elements 41, 31A are respectively provided with color filters as shown in FIGS. 42A and 42B.

In the present embodiment, the object image formed on the image taking means 41 is released therefrom as electrical signals (G signals), which are retained in a sample-hold (S/H) circuit 51, then converted into digital signals by an analog-digital (A/D) conversion circuit 52 and stored in a memory circuit 53.

Also the object image formed on the image taking means 31 is released from the image sensor element 31A as electrical signals (alternate R and B signals), which are retained in sample-hold (S/H) circuits 54A, 54B at the respective timings of the R and B signals, thereby being separated into the R and B signals. The signals are then converted into digital signals by analog-digital (A/D) conversion circuits 55A, 55B and stored in memory circuits 56A, 56B. The G signals stored in the memory 53 are supplied to the luminance signal processing circuit 57 and the color signal processing circuit 58.

Also the R and B signals stored in the memories 56A, 56B are read therefrom and supplied to the color signal processing circuit 58. The luminance signal processing circuit 57 effects necessary signal processing, such as auto gain control (AGC) and gamma correction, thereby generating luminance signals.

The color signal processing circuit 58 effect signal processing, such as AGC, gamma correction and white balance adjustment, on the entered R, G and B signals, and generates color difference signals through a matrix process. These output signals are used for obtaining color image signals for color reproduction.

The present embodiment can reduce the electrical power consumption, since the number of the image sensor elements constituting the image taking means 31 is made less in comparison with the foregoing embodiment.

Also the arrangement of the color filters provided on the image sensor elements of the present embodiment is not limited to that shown in FIGS. 42A and 42B, but the present invention is likewise applicable to any filter arrangement, as exemplified in FIGS. 33A, 33B, 34A, 34B, 35A, 35B, 36A and 36B, as long as luminance and color signal components can be obtained.

In the following there will be explained focus detecting methods adapted for use in the apparatus explained in the foregoing.

Figure 44:
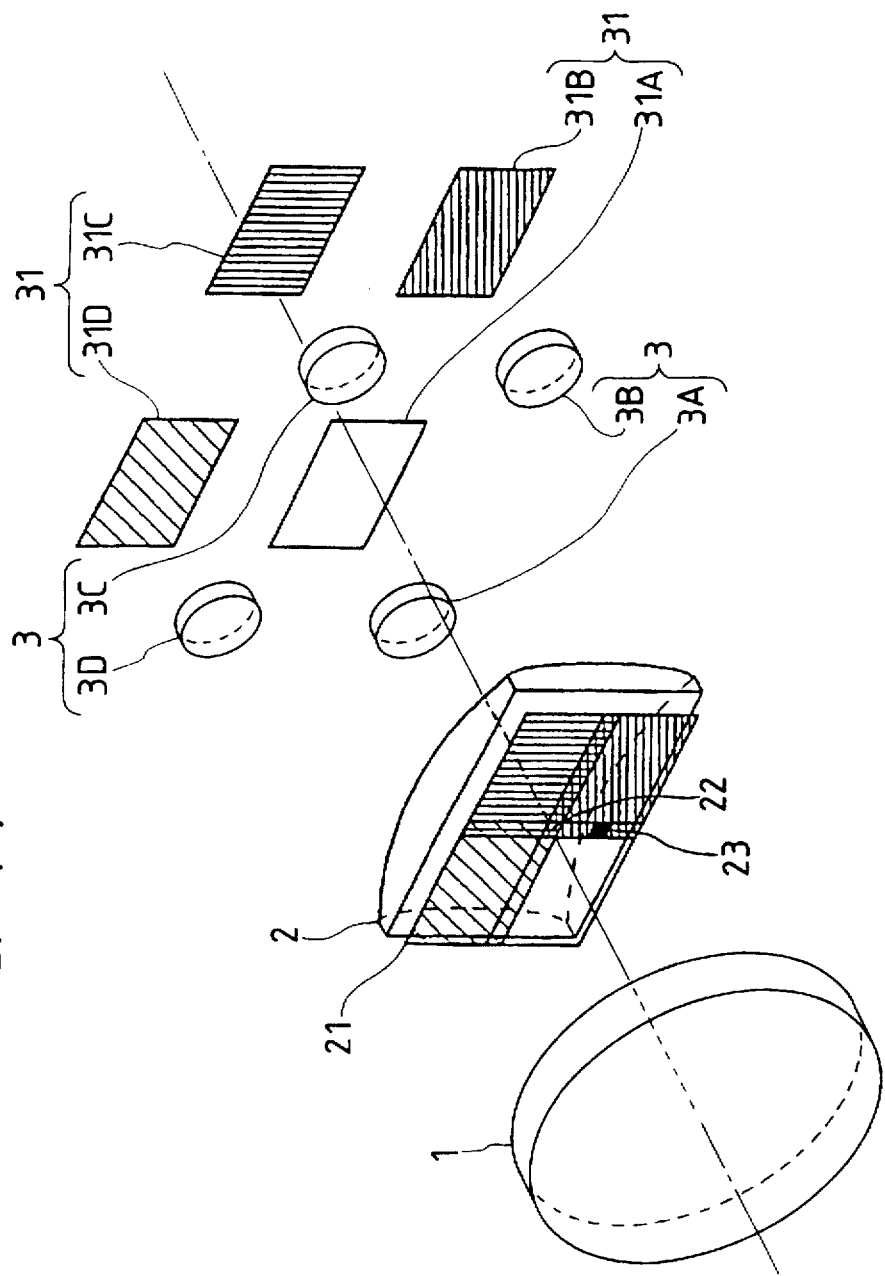
FIG. 44 is a cross-sectional view of the optical system of another embodiment of the present invention.
Figure 45:
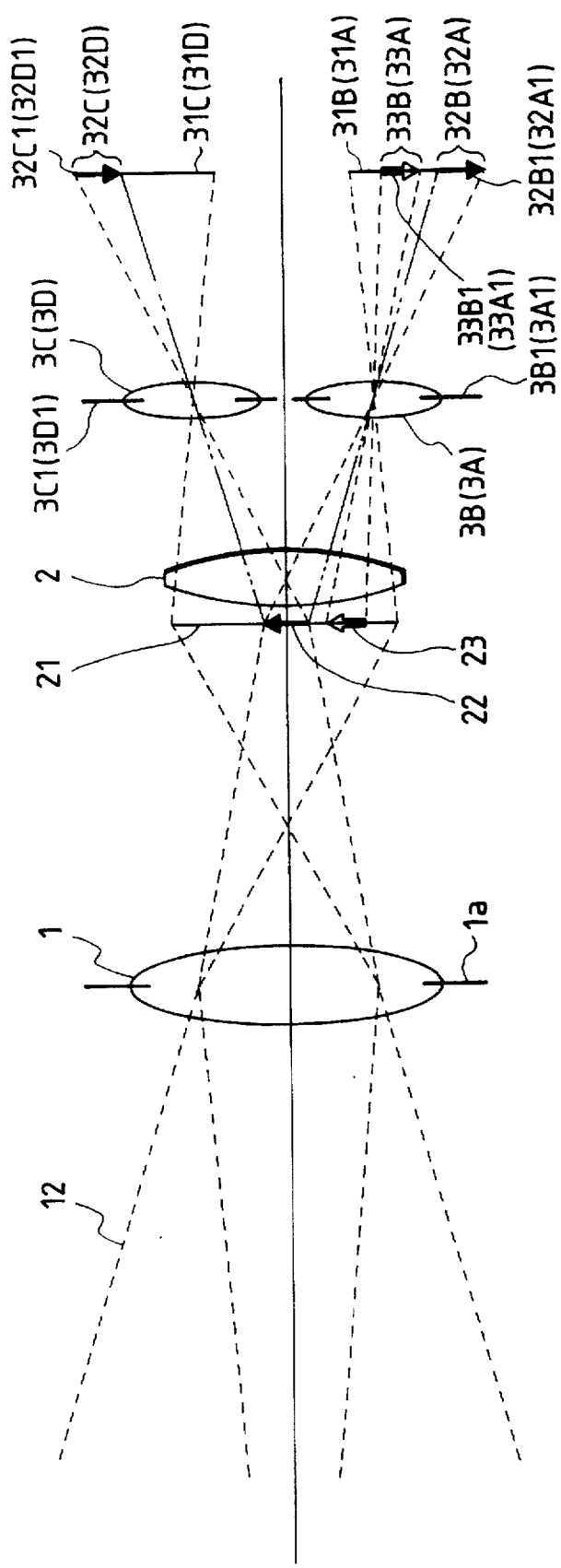
FIG. 45 is a view showing the optical function of the system shown in FIG. 44.

FIG. 44 is a perspective view of an apparatus, constituting the basic concept of the present invention, and FIG. 45 is a schematic cross-sectional view of the optical system in an embodiment of the present invention.

In these drawings, components of same numbers as those in the foregoing embodiments are equivalent in function and will not, therefore, be explained further.

A central image 22, at the center of the object image formed on the primary focal plane 21, is re-focused on an area 32A of the image sensor element 31A, an area 32B of the image sensor elements 31B, an area 32C of the image sensor element 31C and an area 32D of the image sensor element 31D, wherein the areas mutually overlap by the four lens units 3A, 3B, 3C and 3D of the optical unit 3.

An image 23 at an end portion of the object image formed on the primary focal plane 21, is re-focused on an area 33A of the image sensor element 31A and an area 33B of the image sensor element 31B, wherein the areas mutually overlap in the image taking areas of the two lens units 3A and 3B of the optical unit 3.

In the present embodiment, as will be explained in the following, there is executed calculation for focus detection, for an arbitrary image formed in an arbitrary area in the overlapping image taking area.

In the present embodiment, the plural image sensor elements 31A, 31B, 31C and 31D have image taking areas which mutually overlap partly and of which relative positional relationship varies depending on the focus state of the object image, and the focus state is detected by the comparison of the output signals of the image sensor elements, in a part of such overlapping image taking area.

The present embodiment is so constructed that the sum of the plural divided images formed by the optical unit 3 contains the entire area of the object image. More specifically, the neighboring divided images have the pixels in overlapping manner as the boundary portion, in order to avoid defects in the boundary portions of the image.

Figure 46B:
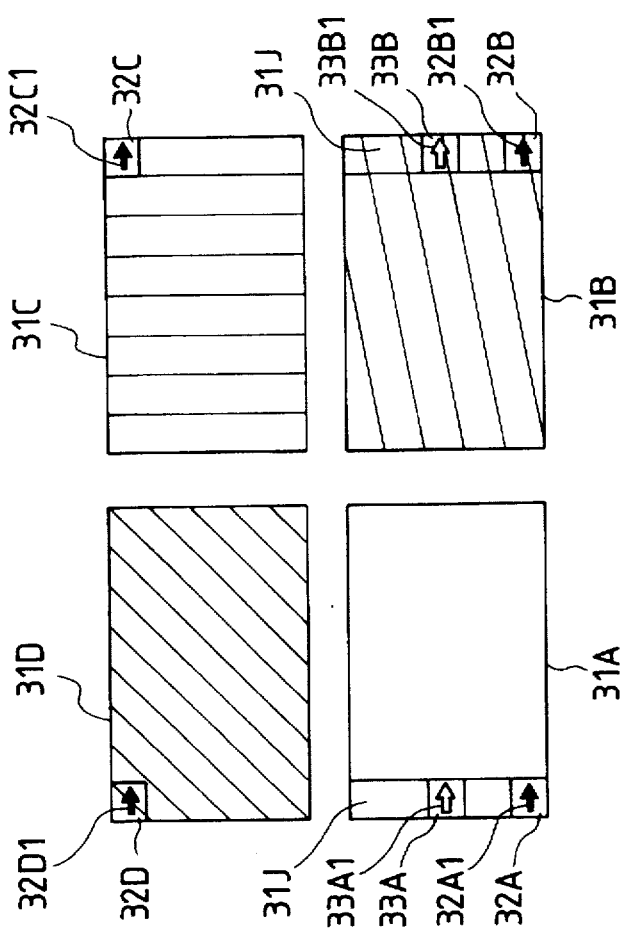
FIGS. 46A and 46B are view s showing the optical function of the system shown in FIG. 44.
Figure 46A:
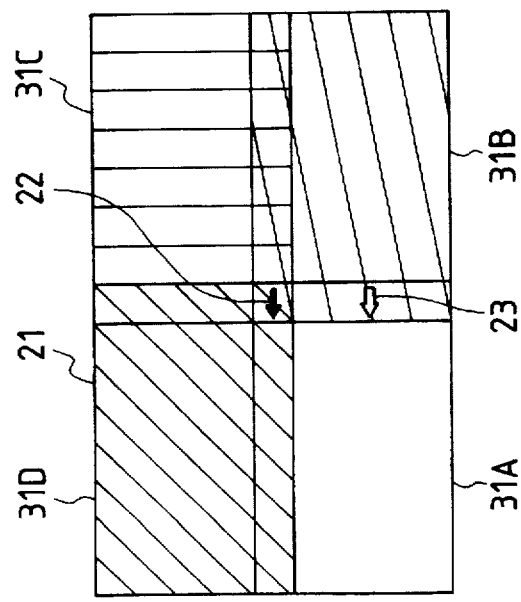

FIGS. 46A and 46B illustrate the mode of combination of the object images, indicating the areas of the object image, respectively taken by the image sensor elements 31A–31D, on the primary focal plane. These drawings also indicate that an image 22 at the center of the image area, present in the overlapping area of the image sensor devices 31A–31D is taken on the areas 32A–32D of the four image sensor elements 31A–31D, and that an image 23 in an end portion present in the overlapping area of the image sensor elements 31A, 31B is taken in the areas 33A, 33B of the two image sensor elements 31A, 31B. In these drawings, same components as those in FIG. 45 are represented by same numbers.

In FIGS. 46A and 46B, 32A1, 32B1, 32C1 and 32D1 indicate the image at the center of the object image, formed in arbitrary portions 32A, 32B, 32C and 32D in the overlapping area of the image sensor elements 31A, 31B, 31C and 31D. Also 33A1 and 33B1 indicate the image at the end portion of the object image, formed in arbitrary portions 33A, 33B in the overlapping area of the image sensor elements 31A, 31B.

In the present embodiment, the image of the boundary (overlapping) portion, for example 31J, of the pixels of two image sensor elements, for example, 31A and 31B, is released without interruption by extraction of the corresponding pixels from the image sensor elements at the image synthesis in the signal processing unit.

Figure 47:
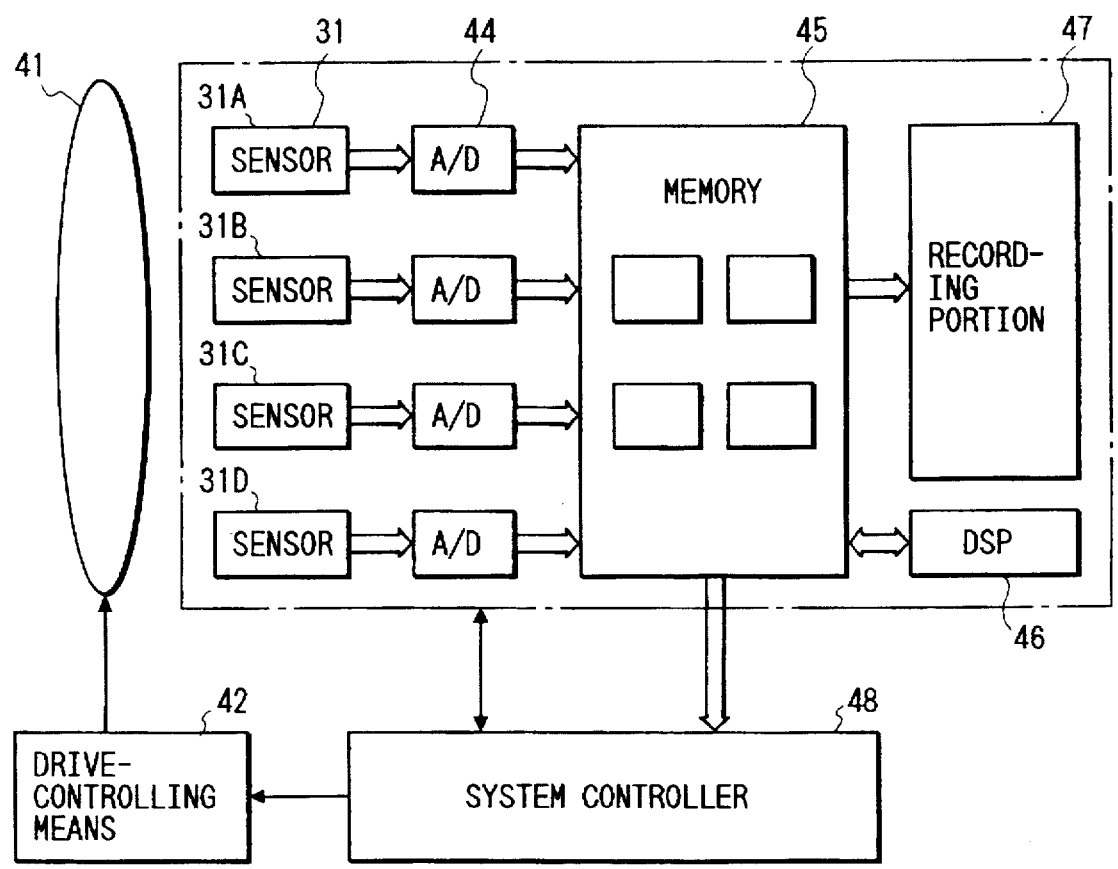
FIGS. 47 to 50 are views showing the signal processing in the apparatus shown in FIG. 44.

FIG. 47 is a schematic block diagram of a focus detecting device for use in an embodiment of the present invention.

In FIG. 47, an image taking optical system 41 includes the first optical unit 1, the second optical unit 2, the optical unit 3 etc.. Drive control means 42 effects drive control for the optical system 41, such as focus state detection and exposure control, based on signal from a system controller 48 to be explained later. Image taking means 31 is provided with four image sensor elements 31A–31D, composed of solid-state area sensors (or one-dimensional line sensors).

An A/D converter 44 converts the analog signals from the image sensor elements 31A–31D into digital signals. A memory 45 serves to store the image information converted in the A/D converter 44, and image data generated in a digital signal processor (DSP) 46 to be explained later. Said digital signal processor 46 generates image data (image information) of a high resolving power, by image combination process in the vicinity of the boundary portions of the four image sensor elements 31A–31D, based on the data of the overlapping areas of the object image, shown in FIGS. 46A and 46B.

A recording portion 47, composed for example of a semiconductor memory card or a rigid disk, records for example the image data generated in the digital signal processor 46, through the memory 45. A system controller 48 controls the image taking and recording operations.

In the following there will be explained the focus detecting method of the present embodiment, with reference to FIGS. 46A, 46B and 47.

At first the image data from the image sensor elements 31A, 31B, corresponding to the images 32A1, 32B1 in the overlapping area, are read from the memory 45 and transferred to the system controller 48, and compared therein. Then, the direction and amount of defocus of the central image 22 are calculated from the direction and amount of aberration between the images 32A1 and 32B1, and the drive control means 42 drives the image taking optical system 41 according to the result of the calculation, thereby achieving focusing. In the present embodiment, the focusing is achieved by the movement of the first optical unit 1 in the image taking optical system 41.

This focus detecting calculation is conducted by so-called phase difference detecting method, for detecting the focus state from two images obtained by pupil division, as proposed for example in the Japanese Patent Laid-Open Application No. 58-142306.

In the present embodiment, the focus state is detected, as explained above, by the comparison of the image data of the images 32A1 and 32B1, formed in the overlapping areas 32A, 32B of the image sensor elements 31A, 31B, but there may be also conducted, thereafter, the comparison of the data of the images 32C1, 32D1 formed in the overlapping areas 32C, 32D of the image sensor elements 31C, 31D. Thus, in the present embodiment, the focus state detection can be conducted by the comparison of arbitrary plural data among four image data.

Also in the present embodiment the focus state detection is conducted at the position of the central image 22 as explained above, but, if it is desired to effect the focus state detection at the image position 23 at the end portion, there can be compared the data of the images 33A1, 33B1 respectively formed in portions 33A, 33B of the overlapping areas of the image sensor elements 31A, 31B.

Furthermore, in the present embodiment, the length of the image data, or the image height, can be selected within the overlapping area of the image sensor elements, so that the comparison can be made even with data extending from an end to the other end of the image area.

Figure 48:
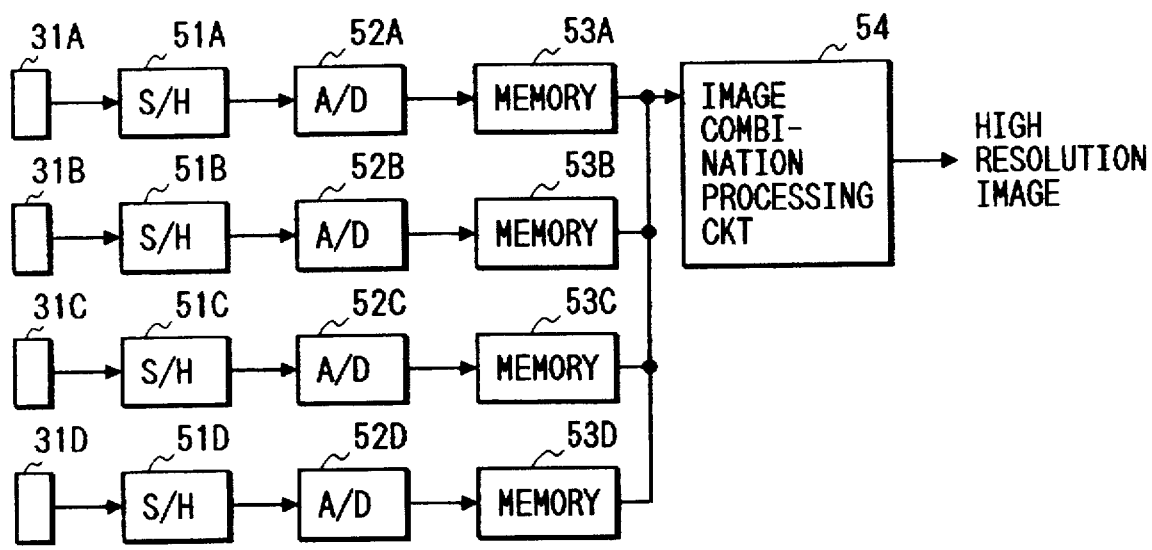

In the following the image processing method of the present embodiment will be explained with reference to FIG. 48, which is a block diagram of the signal processing unit of the image taking apparatus of the present embodiment.

Electrical signals from the image sensor elements 31A–31D are retained in sample-hold circuits (S/H circuits) 51A–51D, then converted into digital signals by analog-digital (A/D) conversion circuits 52A–52D, and stored in memory circuits 53A–53D. Then the image of a high resolving power is obtained by reading the information from the memories 53A–53D and synthesizing the information in an image combination process circuit 54.

Figure 49:
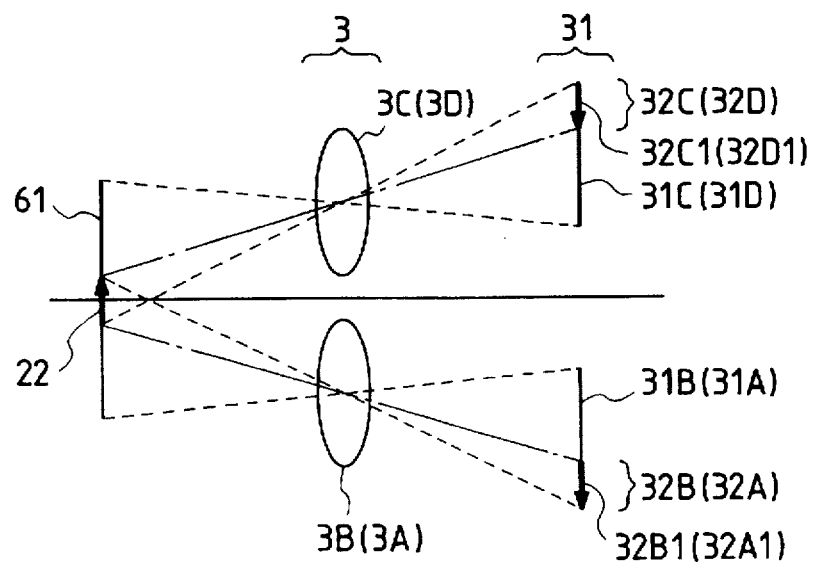

FIG. 49 is a schematic cross-sectional view of the optical system of another embodiment of the present invention, wherein same components as those in FIG. 45 are represented by same numbers.

In the foregoing embodiment, the focus state detection is conducted by so-called secondary imaging method which utilizes a secondary image of the object, formed through the second and third optical unit from the object image focused by the first optical unit. The present embodiment is different from the foregoing one in that the focus state detected by the primary imaging method which does not utilize the first optical unit but in which the different areas of the objects are primarily focused by plural optical units onto the respectively corresponding image sensor elements. Other configurations and the optical functions are similar to those in the foregoing embodiment, whereby similar effects are obtained.

In the present embodiment, the object 61 is divided into plural areas by plural lens units 3A, 3B, 3C, 3D constituting the third optical unit 3, and thus divided images of the object 61 are focused primarily on the image sensor elements 31A, 31B, 31C, 31D respectively corresponding to the plural lens units 3A, 3B, 3C, 3D. The focusing is achieved, as in the foregoing embodiment, by similarly calculating the direction and amount of defocus of the object image from the direction and amount of aberration of the images 32A1, 32B1 at the center 22 of the object 61, formed in the overlapping areas 32A, 32B of the two image sensor elements 31A, 31B.

In the foregoing embodiments, the focus state is detected by respectively scanning the entire area of the plural image sensor elements, but such detection may also be achieved, as proposed in the Japanese Patent Laid-Open Application No. 4-212577, by only scanning the overlapping areas, to be compared, of the plural image sensor elements, and the time required for focus state detection may be shortened in this manner.

Also the focus state detection may be combined with so-called mountain-climbing servo method for controlling the image taking optical system so as to maximize the high frequency components in the image signal from the image sensor element, as often employed in video cameras or the like, and such method enables the focus state detection outside the overlapping areas of the plural image sensor elements.

In the following there will be explained such focus detecting method by the mountain-climbing servo, with reference to FIG. 50.

Figure 50:
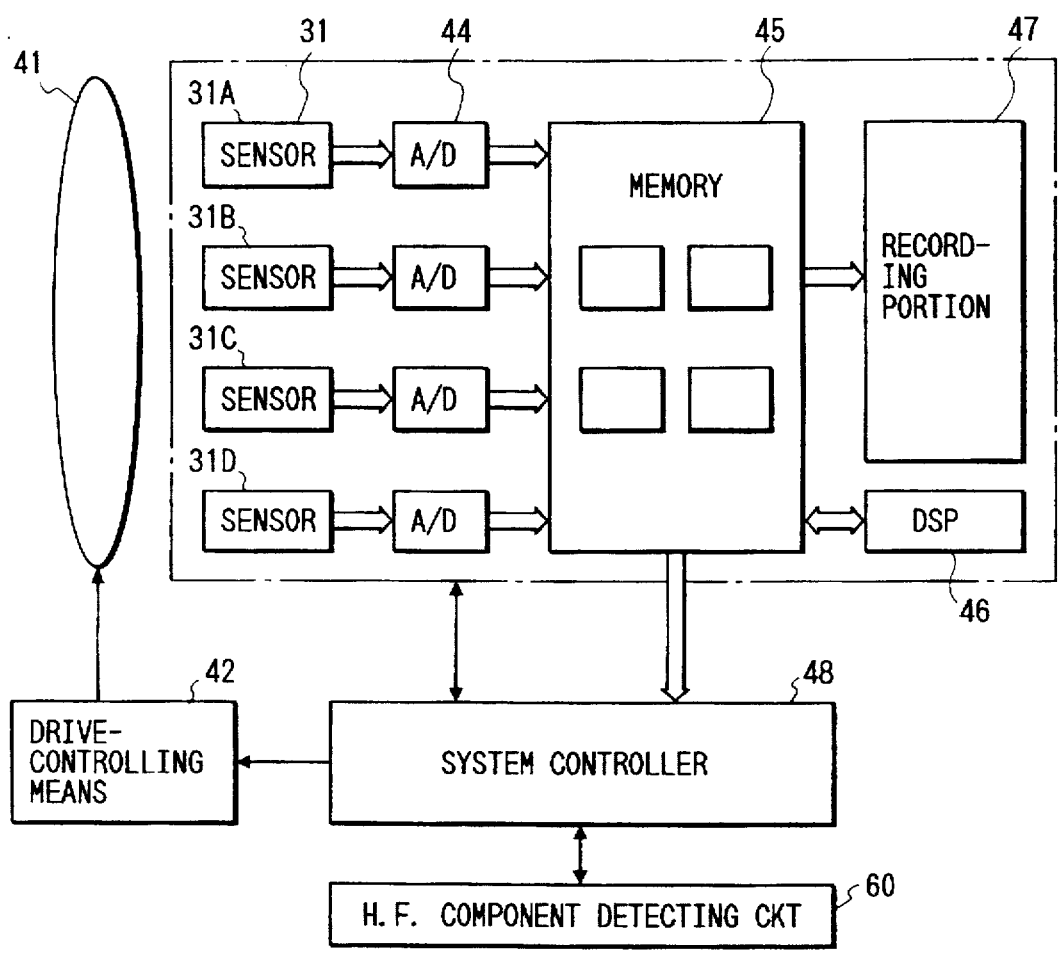
Figure 51:
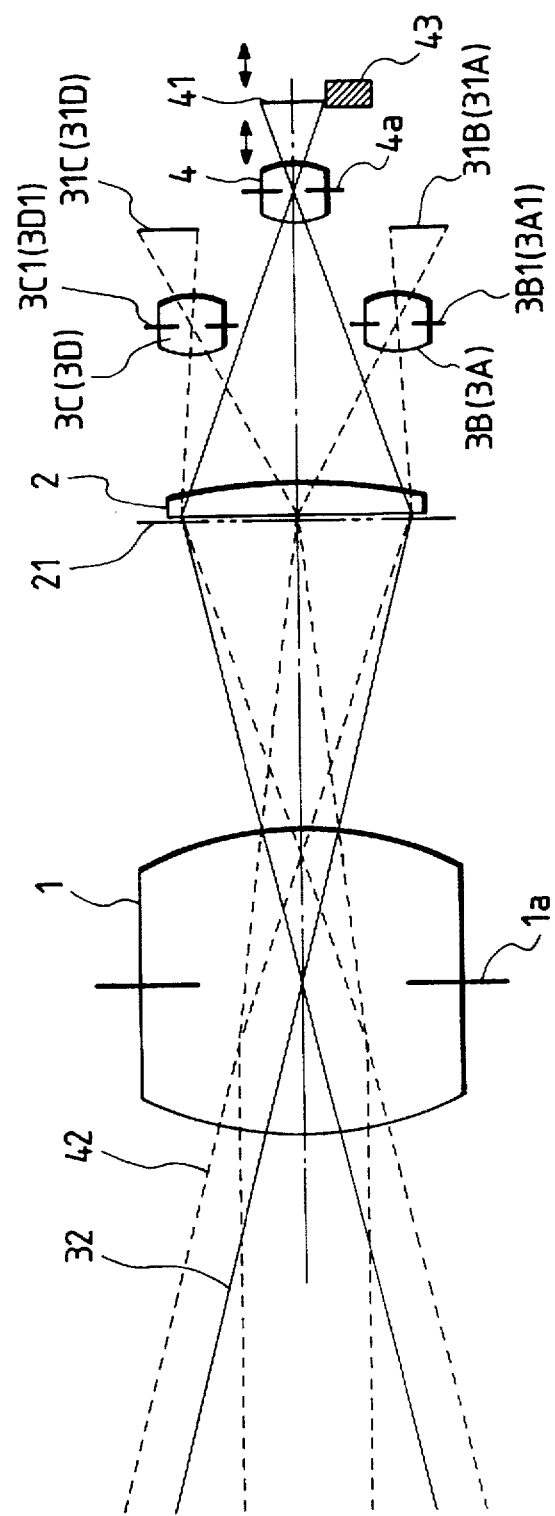
FIGS. 51 and 52 are cross-sectional views showing the optical system of the other embodiments of the present invention.
Figure 52:
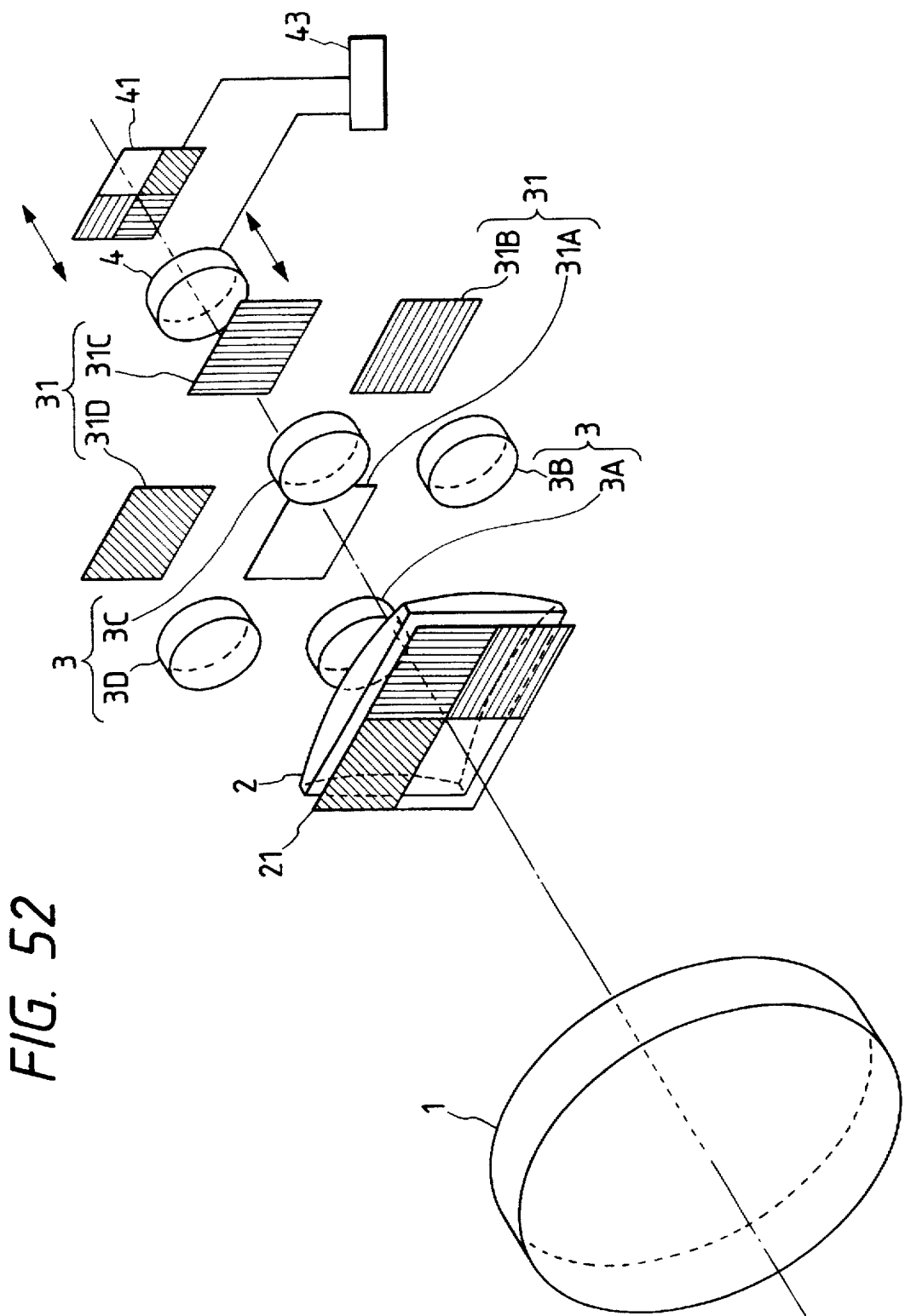
Figure 53:
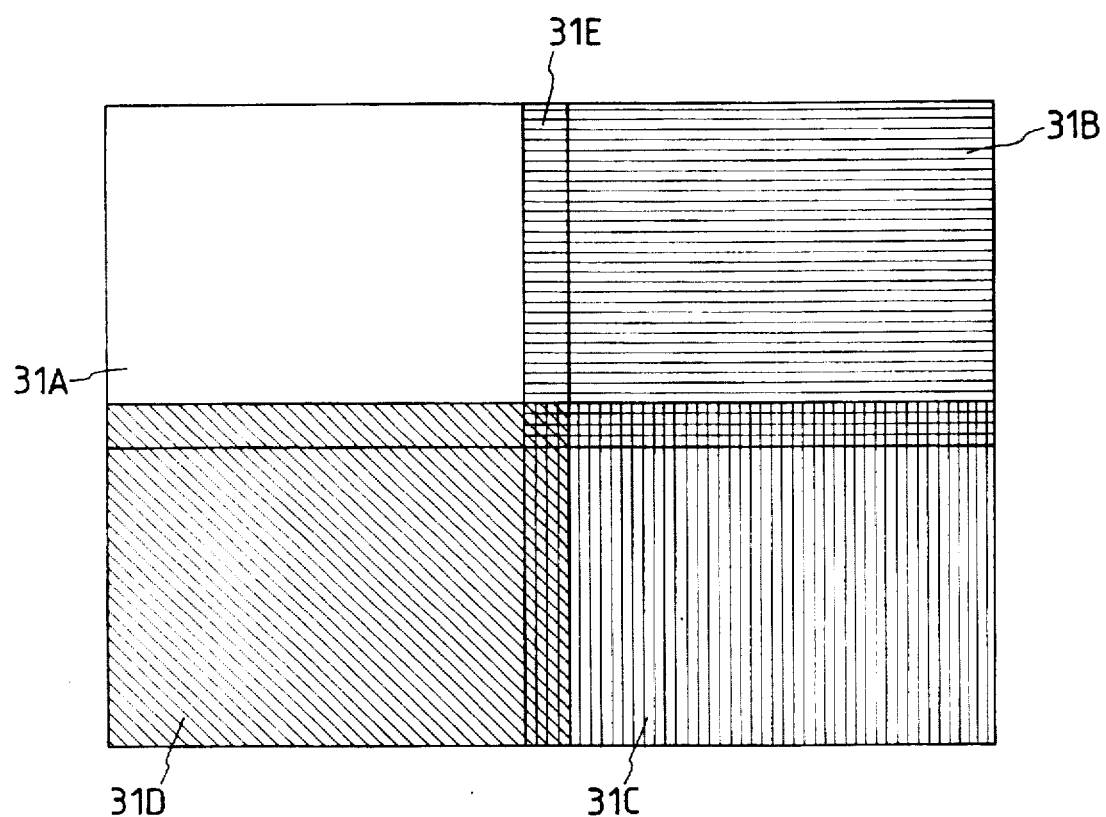
FIG. 53 is a synthesized view of image taking area of the image taking means shown in FIG. 51.

FIG. 50 is a schematic block diagram of a focus detecting device utilizing the mountain-climbing servo method, wherein same components as those in FIG. 47 are represented by same numbers.

The circuit shown in FIG. 50 contains a high frequency component detection circuit 60, in addition to the circuit shown in FIG. 47, and other configuration are substantially same.

For effecting focus state detection, data of an area, in which the focus state detection is to be conducted, are extracted from an area stored in the memory 45, and the high frequency components of the data are extracted by the high frequency component detection circuit 60 through the system controller 48. Then the image taking optical system 41 is driven by the drive control means 42 through the system controller 48, to a point where the high frequency components become maximum, namely the point in focus.

Such mountain-climbing servo method, in the auto focusing of the video cameras or the like, has the advantages of providing a high precision and not requiring a particular sensor, because the focus state detection is achieved by direct evaluation of the image signal from the image sensor element. On the other hand, it requires a long time until the focused state is reached, because the direction and amount of aberration to the focus state cannot be detected in a single measurement so that the focus detecting calculation has to be repeated plural times.

On the other hand, the focus detecting method of the present embodiment can achieve quicker focus state detection in comparison with the mountain-climbing servo method, as the amount and direction of aberration to the focus state can be detected in a single measurement.

In the present embodiment, therefore, the focus state detection is conducted at first by the method explained in the foregoing embodiment thereby achieving approximate detection within a short time, and is then conducted by the above-explained mountain-climbing method in the same focus detecting area, thereby achieving the precise detection at a high speed.

In case the focusing is to be made to an object positioned outside the overlapping area of the image sensor elements, the focus state detection may be made from the beginning with the mountain-climbing servo method explained above.

In the present embodiment, since an image of a high resolving power is obtained from four image sensor elements, image data of about four times are available for the focus detecting calculation in either of the above-mentioned two focus detecting methods, in comparison with the case of focus state detection with a single image sensor element, so that the precision of the focus state detection can be improved.

In the foregoing embodiments, the third optical unit is composed of four lens units, but the number of such lens units and of the corresponding image sensor elements may be increased to improve the resolving power and the precision of focus state detection.

Also in case of a still image, the aforementioned pixel displacement method may be used in combination to further improve the resolving power.

In the focusing of a compact video camera or a still video camera, there is employed so-called television AF method in which the image sensor element or at least a part of the lens system is axially moved in reciprocating motion and the output peak of the high frequency components of the image signal is detected.

In such image taking apparatus, the highly precise image may be deteriorated for example by vibration, because the image sensor element or a part of the lens system is axially reciprocated also at the image taking.

In the image taking apparatus of another embodiment, therefore, the focus state is detected by the signal from the image taking means 41 corresponding to the optical unit 4, then the image taking means 41 and/or at least a part of the lenses constituting the optical unit 4 is axially moved by the drive means 43 when the focus is required, and the focusing is achieved by axial movement of the optical unit 1 or the plural lens units 3A–3D of the optical unit 3 based on the information thus obtained from the image taking means 41.

In this manner the highly precise synthesized image, obtained by the optical unit 3, can be protected from the deterioration for example by the vibration.

Also in the present embodiment it is possible to recognize the three-dimensional shape of the object from the distribution of focus position of the image, by axially moving at least a part of the lenses of the optical system 4, for example at a constant speed, and the synthesized image obtained by the optical unit 3 can be maintained constant even in such recognizing operation.

In the present embodiment, in case the image of a high resolving power is required, the object image is dividedly focused, by the optical unit 3 consisting of four lens units 3A–3D, on the respectively corresponding image sensor elements 31A–31D, and the entire image of the object is obtained by synthesizing the image information from the four image sensor elements 31A–31D in the signal processing unit, eventually with the information formed by the optical unit 4 and taken by the image taking means 41.

Also in case the image of a high resolving power is not required, the entire object image is formed by the optical unit 4 on the image taking means 41, and the image information obtained therefrom is utilized.

In the following there will be explained an embodiment capable of correcting the shading resulting from the eccentricity of the optical unit 3.

As regards the basic configuration, reference is to be made to the embodiment shown in FIG. 5.

FIG. 54A is a view showing the shading characteristics on the surface of the image sensor element 41, wherein an area 32 represents the distribution of the level on the surface. Also FIG. 54B shows the shading characteristics on the surfaces of the image sensor elements 31A, 31B, 31C and 31D, wherein areas 42A, 42B, 42C and 42D respectively correspond to the image sensor elements 31A–31D. In these drawings, the X-Y plane represents the light-receiving surface of the image sensor element, while the height represents the luminance distribution of the shading component, generated for example by the light amount loss in the peripheral area. For example, in case of the shading phenomenon generated by the peripheral light amount loss in the first optical unit 1, the shading on the image sensor element 41 has a higher luminance at the center and lower in the peripheral portion, as indicated by the area 32. On the other hand, the shading on each of the image sensor element 31 is equal to a quarter of that on the image sensor element 41. Consequently the shadings generated on the divided image sensor elements 31A, 31B, 31C, 31D are as indicated by the areas 42A, 42B, 42C, 42D in FIG. 54B. Said shadings of the areas 42A–42D can be compensated by the shading of the area 32, corresponding to the low frequency component of the output of the image sensor element 41.

Figure 56:
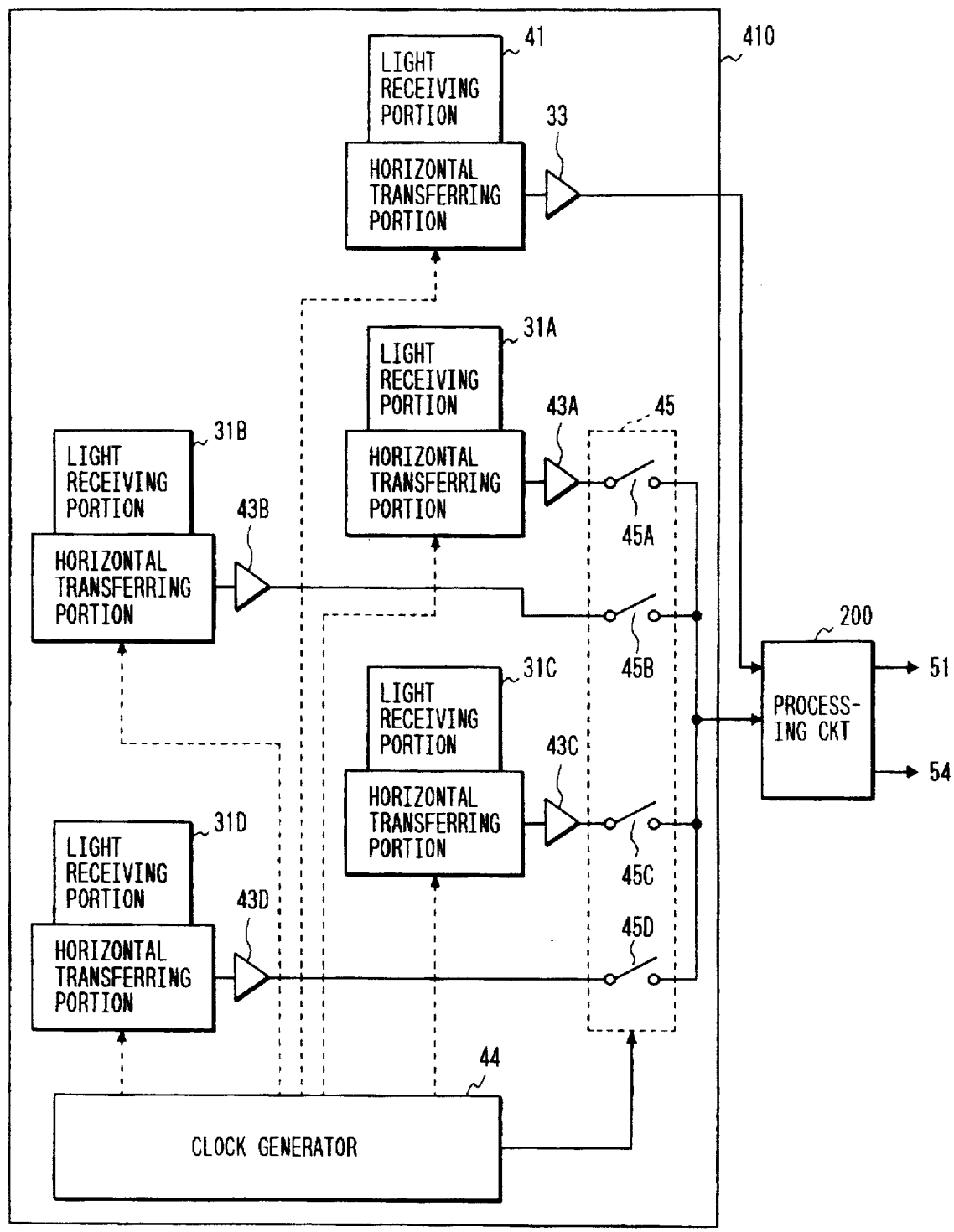

FIG. 56 is a block diagram of a video camera, equipped with an image taking apparatus embodying the present invention. In FIG. 56 there are shown an optical system 100 composed of the aforementioned first to fourth optical units 1–4, the image sensor elements 31, 41 etc.; a process circuit 200 for forming, from the image signal obtained from the optical unit 1, R-G-B signals or a luminance signal (Y) and color difference signals (R-Y, B-Y); an A/D converter 300 for converting the analog output signals of the process circuit 200 into digital signals; a digital signal processing circuit 400 composed of a memory and other various processing circuits, including a shading compensation circuit to be explained later; a digital recording system 500 for recording the digital signals from the digital signal processing circuit 400 on a memory card or a rigid disk; a D/A converter 600 for converting the digital signals from the digital signal processing circuit 400 into analog signals; a recording system 700 for recording the output analog signals from the D/A converter 600 on a tape or a disk with modulation; and a video output circuit 800 for releasing the output signals of the D/A converter 600 for example to an outside monitor.

Figure 55:
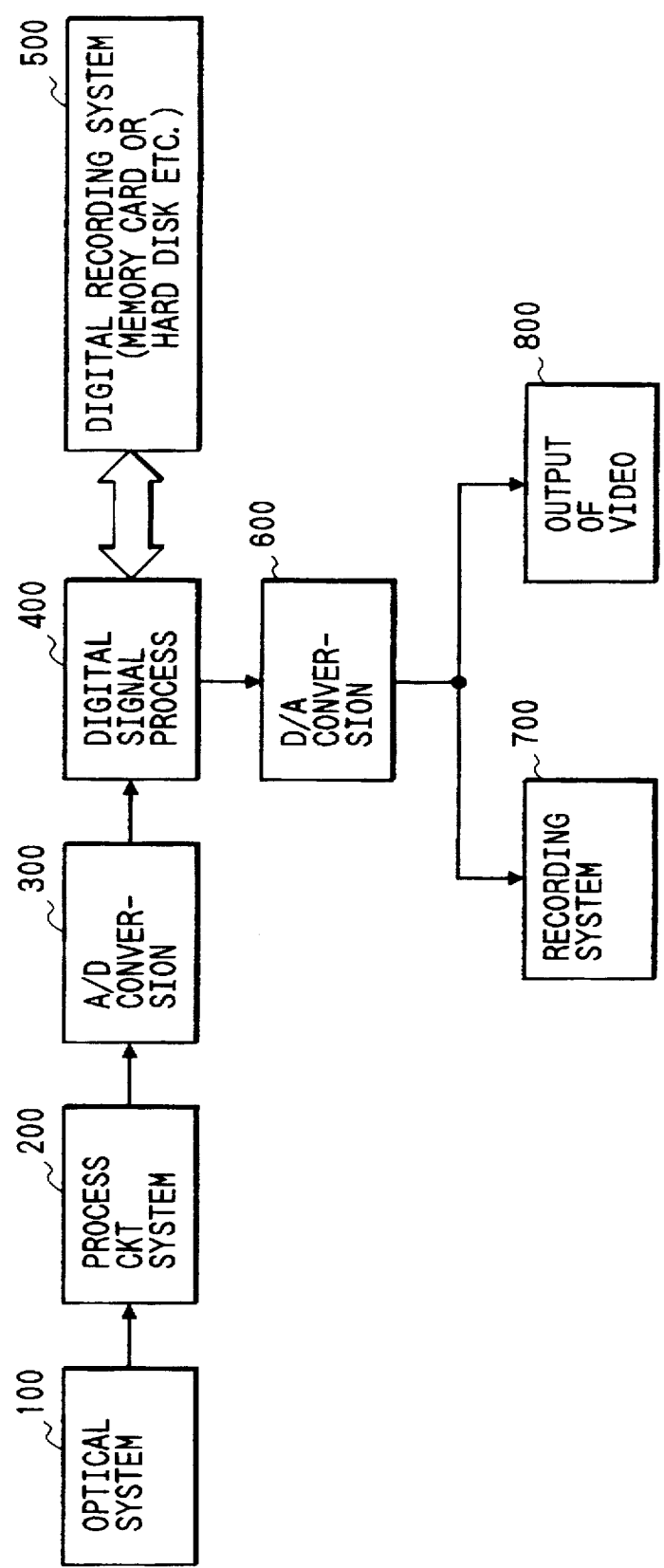
FIGS. 55 and 56 are block diagrams showing the signal processing in the apparatus shown in FIG. 51.

In the following there will be explained, with reference to FIG. 56, the method of image output of the image sensor elements 31, 41. A block 410 indicates the electrical circuits of the optical unit 100 in FIG. 55, particularly the photosensor portions. Image sensor elements 41, 31A–31D are same as those shown in FIG. 5, and indicate the photosensor portions and signal transfer portions thereof. These elements are driven by a clock generator 44 and signal charges are read from the elements. The read charges are converted into voltages by buffers 33, 43A–43D, and the signal from the buffer 33 is directly supplied to the process circuit 200, while the signals from the buffers 43A–43D are supplied to analog switches 45, which are switched in succession by switching pulses from the clock generator 44. The reading operations of the image sensor elements 31A–31D are conducted in the following manner. At first the first horizontal line of the image sensor element 31A is read. In this state, within the analog switches 45, a switch 45A is turned on while others are turned off. Subsequently the first horizontal line of the image sensor element 31B is read, and, a switch 45B in the analog switches 45 is turned on while others are turned off. Thereafter the image sensor elements 31A and 31B are read alternately, for every line. The succeeding process circuit 200 generates synchronization signals based on the clock pulses from the clock generator 44, in such a manner that a horizontal line is constituted by the image sensor elements 31A and 31B. After all the lines of the image sensor elements 31A and 31B are read, the image sensor elements 31C and 31D are read alternately for every line. The succeeding process circuit 200 similarly generates the horizontal synchronization signals, in the same manner as for the image sensor elements 31A and 31B, in such a manner that a horizontal line is constituted by the image sensor elements 31C and 31D. When all the lines of the image sensor elements 31C and 31D are read, a vertical synchronization signal is generated. In this manner the images of the divided image sensor elements 31 are combined at the output of the process circuit 200, thereby providing an image of a high resolving power.

The output of the image sensor element 41 is naturally processed in predetermined manner in the process circuit 200 and is then given horizontal and vertical synchronization signals.

Figure 57:
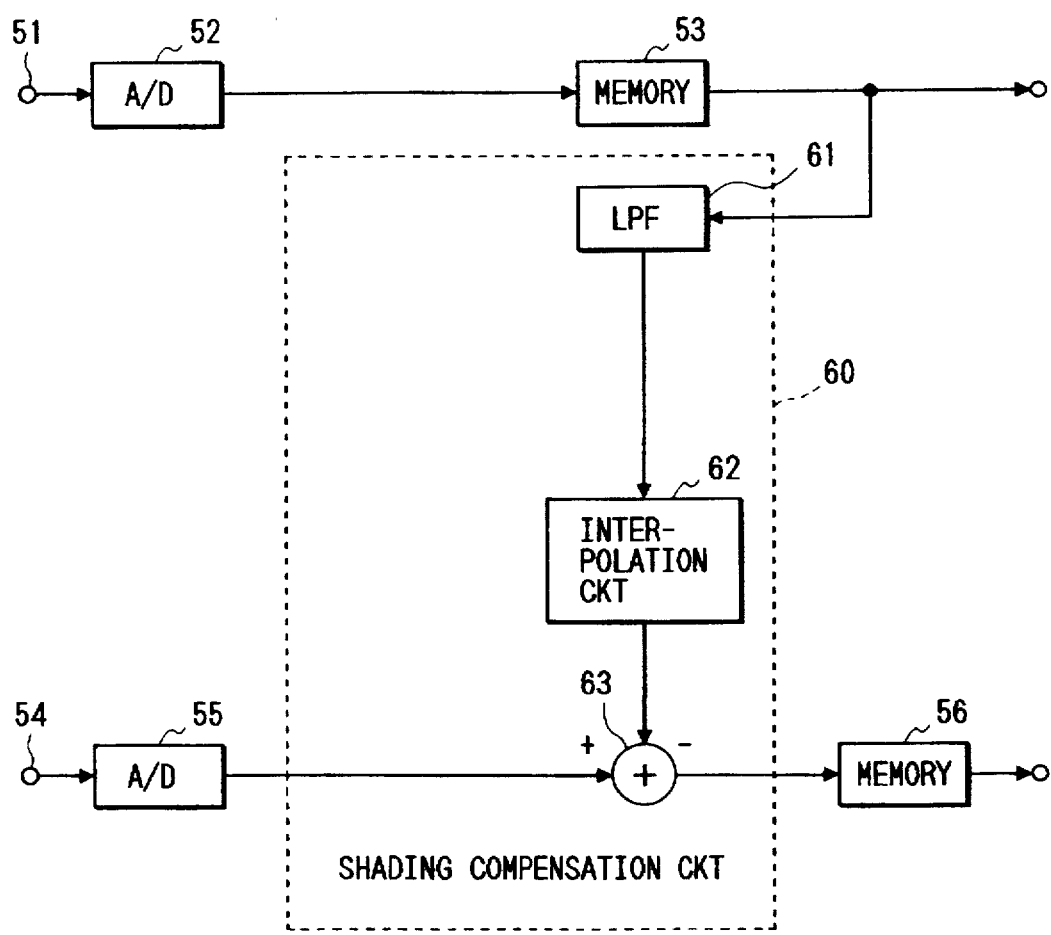
FIGS. 57 to 60 are circuit diagrams showing shading compensation circuits in the present invention.

FIG. 57 shows a circuit for compensating the shading of the image sensor elements 31, wherein shown are a terminal 51 for entering the full-frame image signal, obtained processing the output of the image sensor element 41 with the process circuit 200; an A/D converter 52 for converting the full-frame image signal, entered from the terminal 51, into digital signals; a memory circuit 53 for storing the output of said A/D converter 52; a terminal 54 for entering high-definition image signals, obtained by processing the output of the image sensor elements 31, with the process circuit 200; an A/D converter 55 for converting the high-definition image signals from the terminal 54 into digital signals; and a memory circuit 56 for storing the output of the A/D converter 55. A shading compensation circuit 60 is composed of a low-pass filter (LPF) 61 for extracting the shading component; an interpolation circuit 62 for matching the data of the memory circuit 53 with the total number of pixels of the image sensor elements 31 serving as the high-definition sensors; and a subtraction circuit 63 for subtracting the shading component from the high-definition image signals. In this manner the high-definition image can be corrected for the shading by the subtraction of the shading data from the high-definition image signals obtained from the image sensor elements 31, utilizing the shading component data of the full-frame image signals of said image sensor element 41.

Figure 58:
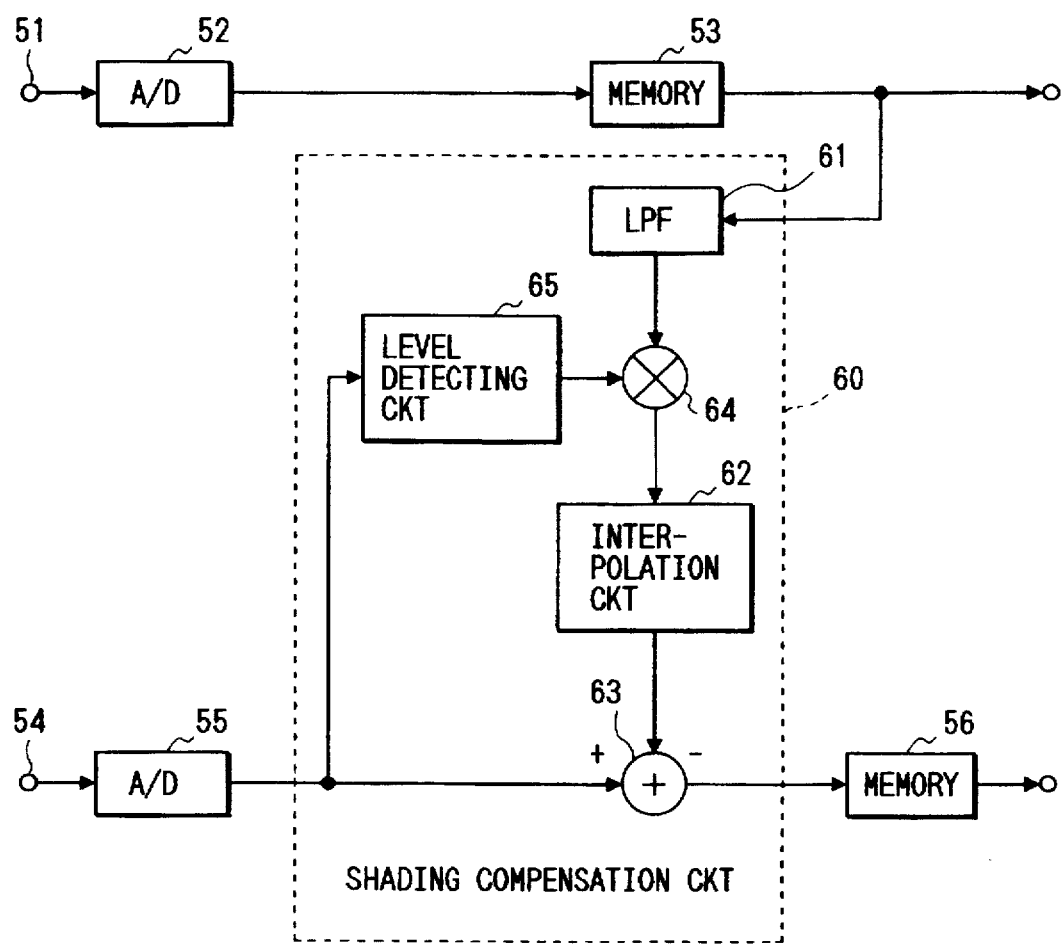

In the following there will be explained another embodiment of the shading compensation circuit 60 with reference to FIG. 58, in which components 61–63 are same as those in FIG. 57, but there are newly added a multiplier 64 and a level detector 65. This circuit effects gain control, in order to control the compensation level of the output of the low-pass filter 61, thereby achieving precise compensation. The multiplying value of the multiplier 64 is determined by the output of the level detector 65, which detects the level of the high-definition image signals from the terminal 54 and controls the multiplying value (or shading compensation level) of the multiplier 64 so as to match thus detected level.

Thus there can be achieved shading compensation in more precise manner than in the embodiment shown in FIG. 57.

Figure 59:
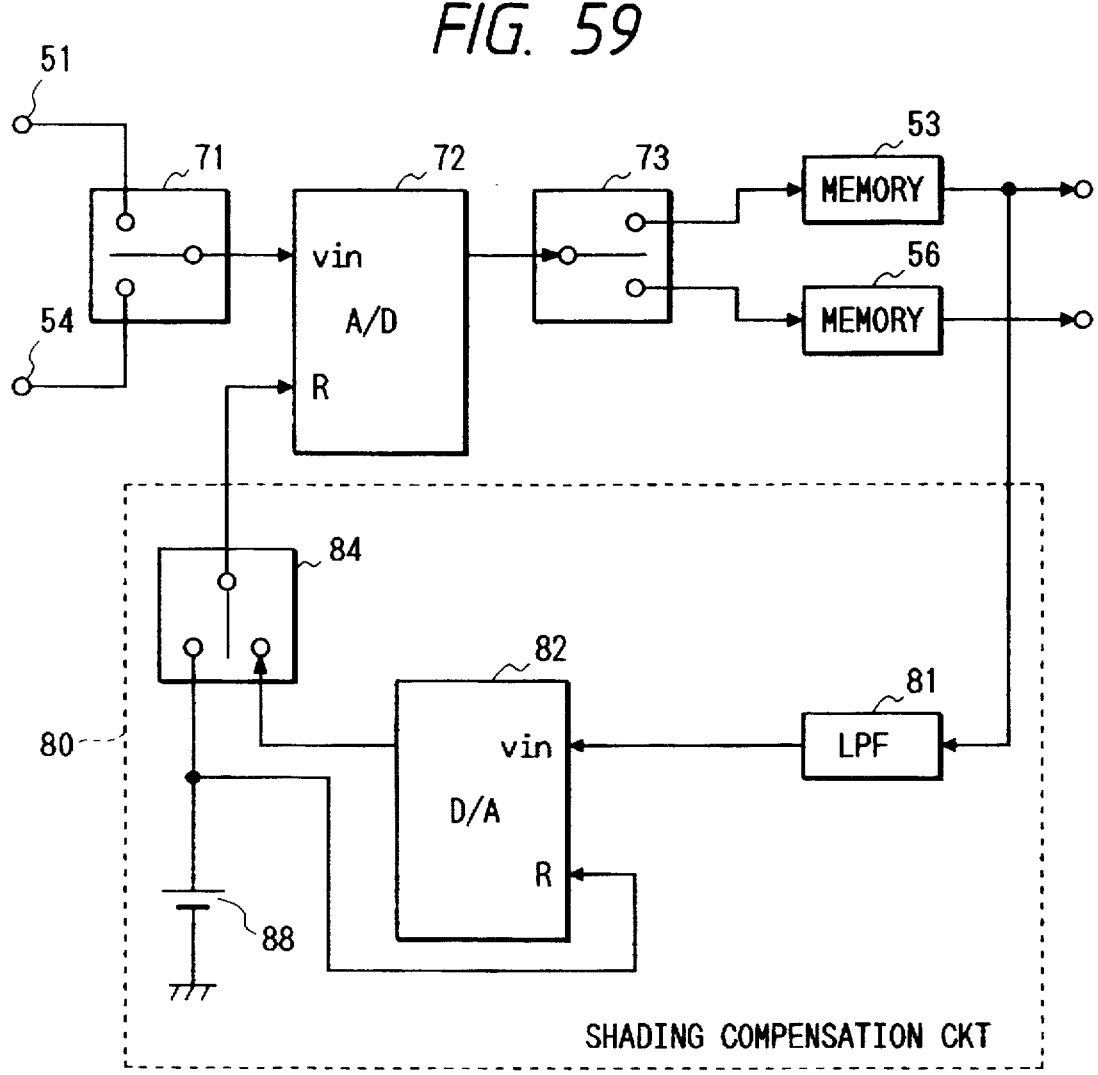

FIG. 59 shows another embodiment of the present invention, wherein components 51, 53, 54 and 56 are same as those in FIG. 57. There are also provided an analog switch 71 for switching the inputs from the terminals 51 and 54; an A/D converter 72 with adjustable reference voltage; a data selector 73 for guiding the output of said A/D converter 72 either to the memory circuit 53 or 56; and a shading compensation circuit 80 for effecting shading compensation by the reference voltage of the A/D converter 72. The shading compensation circuit 80 is composed of a LPF 81; a D/A converter 82 for reference voltage adjustment; a constant reference voltage source 83; and a selector switch 84 for the reference voltage.

The above-explained circuit functions in the following manner. In the normal mode, the analog switch 71 selects the output of the terminal 51. In this state, a constant voltage of the reference constant voltage source 83 is supplied as the reference voltage to the A/D converter 72, and the output thereof is supplied, through the data selector 73, to the memory circuit 53. In the high definition mode, the analog switch 71 selects the output of the terminal 54. The data selector 73 is shifted to the memory circuit 56, while the switch 84 for selecting the reference voltage is shifted also to the side of the D/A converter 82. The output of the memory circuit 53 is supplied to the LPF 81 for the extraction of the shading component, which is converted by the D/A converter 82 into an analog voltage, and supplied as a shading correcting voltage to the reference voltage terminal of the A/D converter 72. Thus the data from the terminal 54 are subjected to shading compensation at the A/D conversion.

Figure 60:
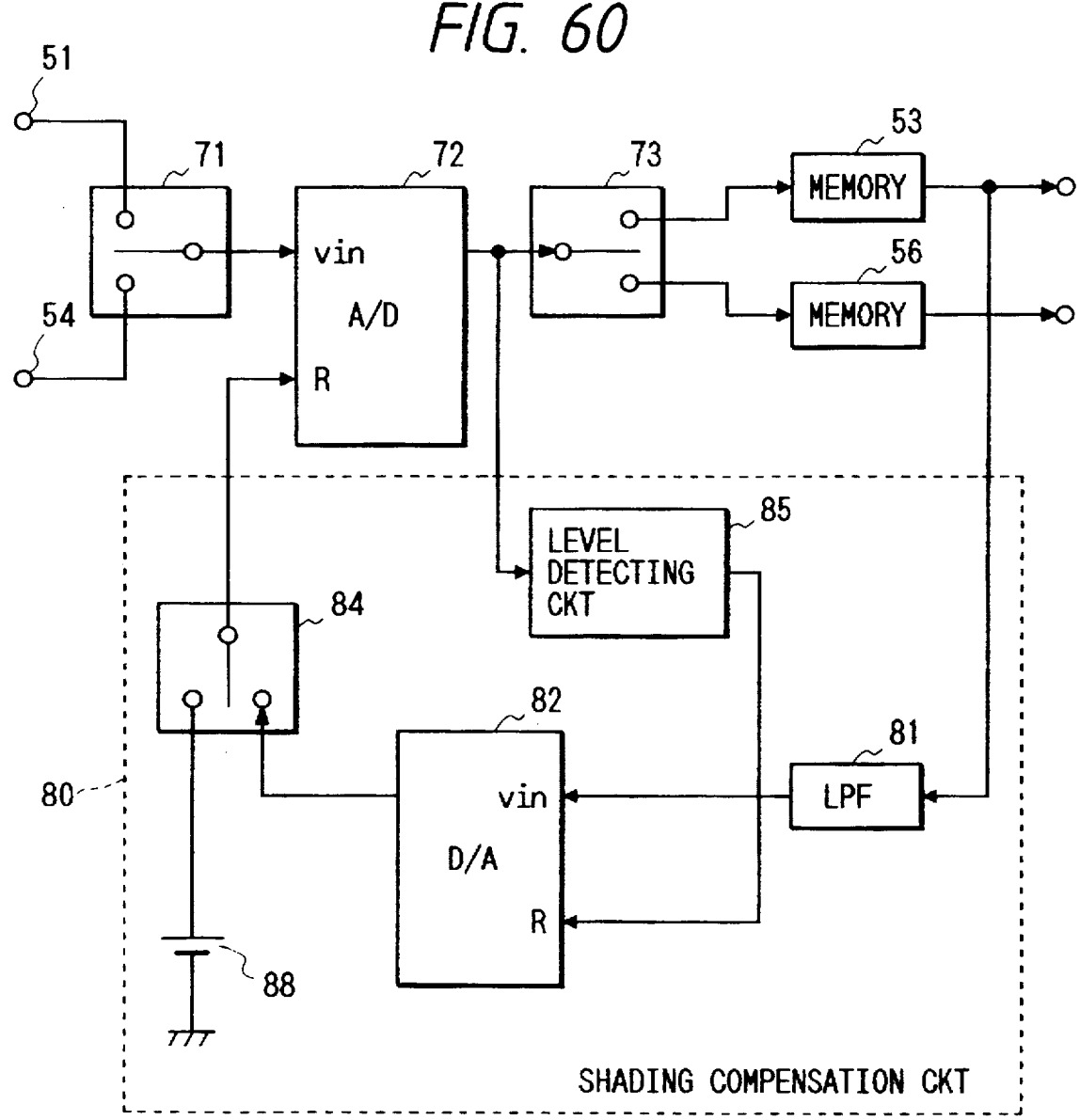

FIG. 60 shows another embodiment of the shading compensation circuit 80, which additionally contains a level detection circuit 85. The level detection circuit 85 improves the precision of shading compensation, by calculating the shading level to be compensated from the output level of the A/D converter in the high precision mode, and varying the reference voltage level of the D/A converter 82 according to the calculated level. The level detection circuit 85 compares the integrated value of the output level of the terminal 51 in the normal mode with that of the output level of the terminal 54 in the high-definition mode, and controls the output voltage according to the difference in the comparison. For example, if the integrated value of the output level of the terminal 51 is larger than that of the output level of the terminal 54 in the high definition mode, the level detection circuit 85 increases the output thereof, thereby elevating the reference voltage of the D/A converter 82 and lowering the shading level to be compensated. On the other hand, if the integrated value of the output level of the terminal 51 is smaller than that of the output level of the terminal 54 in the high definition mode, the output is reduced to lower the reference voltage of the D/A converter 82, thereby elevating the shading level to be compensated. In this manner the precision of the shading compensation can be improved.

As explained in the foregoing, the present invention provides an image taking apparatus which can generate an image of a high resolving power, utilizing image sensor elements of a limited number of pixels, without restriction on the back focus of the image taking optical system and also without defects in the boundary portions between the image areas.

Besides, an image obtained through the optical units and an image obtained by the optical unit 4 can be selectively used respectively if a high resolving power is required or not. Furthermore, the shading compensation of the divided images can be achieved with a high precision, utilizing the image information obtained by the optical unit 4.

What is claimed is:

1. An image taking apparatus comprising:
   a first optical unit for forming an image;
   a second optical unit positioned on the optical axis of said first optical unit;
   a third optical unit positioned behind said second optical unit and having plural lens units, forming a plurality of optical axes, for reforming a part of the image of said first optical unit;
   a plurality of conversion means, each said conversion means converting one of said plural images formed by said third optical unit into electrical signals;
   process means for processing the electrical signals from said conversion means in order to obtain an image of high definition,
   wherein each of plural optical axes of said third optical unit does not coincide with that of said first optical unit,
   a fourth optical unit positioned on the optical axis of the first optical unit, and a
   second conversion means provided at the position of an optical image formed by said fourth optical unit and adapted to convert said optical image into electrical signals.

2. An image taking apparatus according to claim 1, wherein each of said conversion means includes an area sensor.

3. An image taking apparatus according to claim 2, wherein said process means is adapted to combine the electrical signals of said area sensors.

4. An image taking apparatus according to claim 1, wherein said fourth optical unit is adapted to reform a wider area of the image formed by said first optical unit, in comparison with the image area re-focused by said third optical unit.

5. An image taking apparatus according to claim 1, further comprising an optical low-pass filter positioned between said third optical unit and said conversion means.

6. An image taking apparatus according to claim 1, further comprising color filters of mutually different characteristics, positioned respectively in front of said conversion means and said second conversion means.

7. An image taking apparatus comprising
   a first optical unit for forming an image;
   a second optical unit positioned on the optical axis of said first optical unit;
   a third optical unit positioned behind said second optical unit and having plural lens units for reforming a part of the image of said first optical unit;
   conversion means for converting the plural images formed by said third optical unit into electrical signals;
   process means for processing the electrical signals from said conversion means in order to obtain an image of high definition.

wherein at least two lens units are adapted to reform the images of partially overlapping areas, and including focus state detection means for detecting the focus state based on the images of said overlapping areas, and wherein the lens units of said third optical unit are adapted to reform the images of respectively different areas.

8. An image taking apparatus according to claim 1, further comprising drive means for driving said fourth optical unit or said second conversion means along the optical axis.

9. An image taking apparatus according to claim 8, further comprising focus state detection means for detecting the focus state based on the electrical signals from said second conversion means.

10. An image taking apparatus according to claim 1, further comprising compensation means for compensating the shading component, based on the electrical signals from said second conversion means.

* * * * *

UNITED STATES PATENT AND TRADEMARK OFFICE
CERTIFICATE OF CORRECTION

PATENT NO. : 5,757,423
DATED : May 26, 1998
INVENTOR(S) : Tsunefumi Tanaka, et al.

It is certified that error appears in the above-indentified patent and that said Letters Patent is hereby corrected as shown below:

On the title page, Column 2, line 11, change "848/335" to -- 348/335 --

Column 17, line 18, change "dolor" to -- color --.

Signed and Sealed this

Eleventh Day of August 1998

Attest:

BRUCE LEHMAN

*Attesting Officer*     *Commissioner of Patents and Trademarks*